US012225325B2

(12) United States Patent
Liu et al.

(10) Patent No.: US 12,225,325 B2
(45) Date of Patent: Feb. 11, 2025

(54) METHOD, APPARATUS, ELECTRONIC DEVICE, COMPUTER-READABLE STORAGE MEDIUM, AND COMPUTER PROGRAM PRODUCT FOR VIDEO COMMUNICATION

(71) Applicant: Tencent Technology (Shenzhen) Company Limited, Shenzhen (CN)

(72) Inventors: Tiancheng Liu, Shenzhen (CN); Xianyang Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 17/973,410

(22) Filed: Oct. 25, 2022

(65) Prior Publication Data

US 2023/0047858 A1 Feb. 16, 2023

Related U.S. Application Data

(63) Continuation of application No. PCT/CN2021/124089, filed on Oct. 15, 2021.

(30) Foreign Application Priority Data

Oct. 26, 2020 (CN) .......................... 202011156220.5

(51) Int. Cl.
*H04N 7/15* (2006.01)
*G10L 25/87* (2013.01)

(52) U.S. Cl.
CPC ............. *H04N 7/157* (2013.01); *G10L 25/87* (2013.01)

(58) Field of Classification Search
CPC ................................ H04N 7/157; G10L 25/87
See application file for complete search history.

(56) References Cited

U.S. PATENT DOCUMENTS

| 2015/0312523 A1* | 10/2015 | Li | G06F 3/0488 |
| | | | 348/14.03 |
| 2018/0268589 A1 | 9/2018 | Grant | |
| 2019/0340419 A1* | 11/2019 | Milman | G06N 20/00 |

FOREIGN PATENT DOCUMENTS

| CN | 103856390 A | 6/2014 |
| CN | 106817349 A | 6/2017 |

(Continued)

OTHER PUBLICATIONS

Tencent Technology, ISR, PCT/CN2021/124089, Jan. 5, 2022, 3 pgs.
Tencent Technology, WO, PCT/CN2021/124089, Jan. 5, 2022, 4 pgs.
Tencent Technology, IPRP, PCT/CN2021/124089, May 5, 2023, 5 pgs.

*Primary Examiner* — Amal S Zenati
(74) *Attorney, Agent, or Firm* — Morgan, Lewis & Bockius LLP

(57) ABSTRACT

A method for video communication includes: selecting a first virtual object on a first video communication interface and obtaining associated first virtual object information, displaying a first virtual reality video image and a second virtual reality video image on the first video communication interface, the first virtual reality video image corresponds the first virtual object information and a first user feature, and the second virtual reality video image corresponds second virtual object information and a second user feature; and playing a target virtual audio, the target virtual audio including one or both of a first virtual audio or a second virtual audio, the first virtual audio corresponds to first voice data and the first virtual object information, and the second virtual audio corresponds to second voice data and the second virtual object information.

19 Claims, 13 Drawing Sheets

(56) References Cited

FOREIGN PATENT DOCUMENTS

| | | | |
|---|---|---|---|
| CN | 108377356 | A | 8/2018 |
| CN | 108880975 | A | 11/2018 |
| CN | 109740476 | A | 5/2019 |
| CN | 110213521 | A | 9/2019 |
| CN | 110278140 | A | 9/2019 |
| CN | 110677610 | A | 1/2020 |
| CN | 113395597 | A | 9/2021 |
| WO | WO 2020056694 | A1 | 3/2020 |

* cited by examiner

Image 5-41

Image 5-42   Image 5-43   Image 5-44

METHOD, APPARATUS, ELECTRONIC DEVICE, COMPUTER-READABLE STORAGE MEDIUM, AND COMPUTER PROGRAM PRODUCT FOR VIDEO COMMUNICATION

CROSS-REFERENCE TO RELATED APPLICATIONS

This application is a continuation application of PCT Patent Application No. PCT/CN2021/124089, entitled "VIDEO COMMUNICATION METHOD AND APPARATUS, ELECTRONIC DEVICE, COMPUTER READABLE STORAGE MEDIUM, AND COMPUTER PROGRAM PRODUCT" filed on Oct. 15, 2021, which claims priority to Chinese Patent Application No. 202011156220.5, filed with the State Intellectual Property Office of the People's Republic of China on Oct. 26, 2020, and entitled "VIDEO COMMUNICATION PROCESSING METHOD AND DEVICE AND READABLE STORAGE MEDIUM", all of which are incorporated herein by reference in their entirety.

FIELD OF THE TECHNOLOGY

This application relates to the field of computer technologies, and in particular, to a method for video communication and apparatus, an electronic device, a computer-readable storage medium, and a computer program product.

BACKGROUND OF THE DISCLOSURE

With the continuous development of mobile communication technologies, smart terminals such as mobile phones and tablet computers play an important role in people's daily life. Nowadays, people can realize real-time video communication anytime anywhere through smart terminals, which reduces the communication costs for people.

Currently, during video communication through smart terminals, the displayed video is usually the original audio and video data collected by a collection device. Therefore, the video display manner during video communication is dull, resulting in a poor video rendering effect during video communication.

SUMMARY

Embodiments of this application provide a method, an apparatus, an electronic device, a computer-readable storage medium, and a computer program product for video communication, which can improve the video rendering effect during video communication.

The method for video communication provided in the embodiments of this application includes:
selecting a first virtual object on a first video communication interface and obtaining associated first virtual object information, the first video communication interface being an interface for video communication between the electronic device and a second electronic device;
displaying a first virtual reality video image and a second virtual reality video image on the first video communication interface, wherein the first virtual reality video image corresponds to the first virtual object information and a first user feature, the second virtual reality video image corresponds to second virtual object information and a second user feature, wherein the second virtual object information is obtained by selecting a second virtual object on a second video communication interface; and
playing a target virtual reality audio comprising one or both of a first virtual reality audio or a second virtual reality audio, the first virtual reality audio corresponds to first voice data and the first virtual object information, and the second virtual reality audio corresponds to second voice data and the second virtual object information.

The apparatus for video communication provided in the embodiments of this application includes:
a virtual object acquisition module, configured to obtain first virtual object information in response to a first virtual object selection operation on a first video communication interface, the first video communication interface being an interface for video communication between the electronic device and a second terminal of the electronic device;
an image output module, configured to display a first virtual reality video image and a second virtual reality video image on the first video communication interface, the first virtual reality video image being associated with the first virtual object information and a first user feature, the second virtual reality video image being associated with second virtual object information and a second user feature, and the second virtual object information being obtained by the second terminal in response to a second virtual object selection operation on a second video communication interface; and
an audio output module, configured to play a target virtual audio, the target virtual audio including one or both of a first virtual audio or a second virtual audio, the first virtual audio being associated with first voice data and the first virtual object information, and the second virtual audio being associated with second voice data and the second virtual object information.

An embodiment of this application provides an electronic device for video communication, including: a processor and a memory, the memory storing a computer program, the computer program, when executed by the processor, causing the processor to implement the method for video communication in this embodiment of this application.

An embodiment of this application provides a computer-readable storage medium, storing a computer program, the computer program including program instructions, the program instructions, when executed by a processor, implementing the method for video communication in this embodiment of this application.

The embodiments of this application provide a computer program product, the computer program product including computer instructions, the computer instructions, when executed by a processor of an electronic device for video communication, performing the method for method for video communication provided in the embodiments of this application.

The embodiments of this application include at least the following beneficial effects: during video communication, video communication can be realized through virtual audios and videos by using the selected virtual object information (that is, the first virtual object information and the second virtual object information), so that the video display modes in video communication are diversified. Therefore, the video rendering effect in the video communication can be improved.

BRIEF DESCRIPTION OF THE DRAWINGS

To describe the technical solutions in the embodiments of this application more clearly, the following briefly introduces the accompanying drawings required for describing the embodiments of this application. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
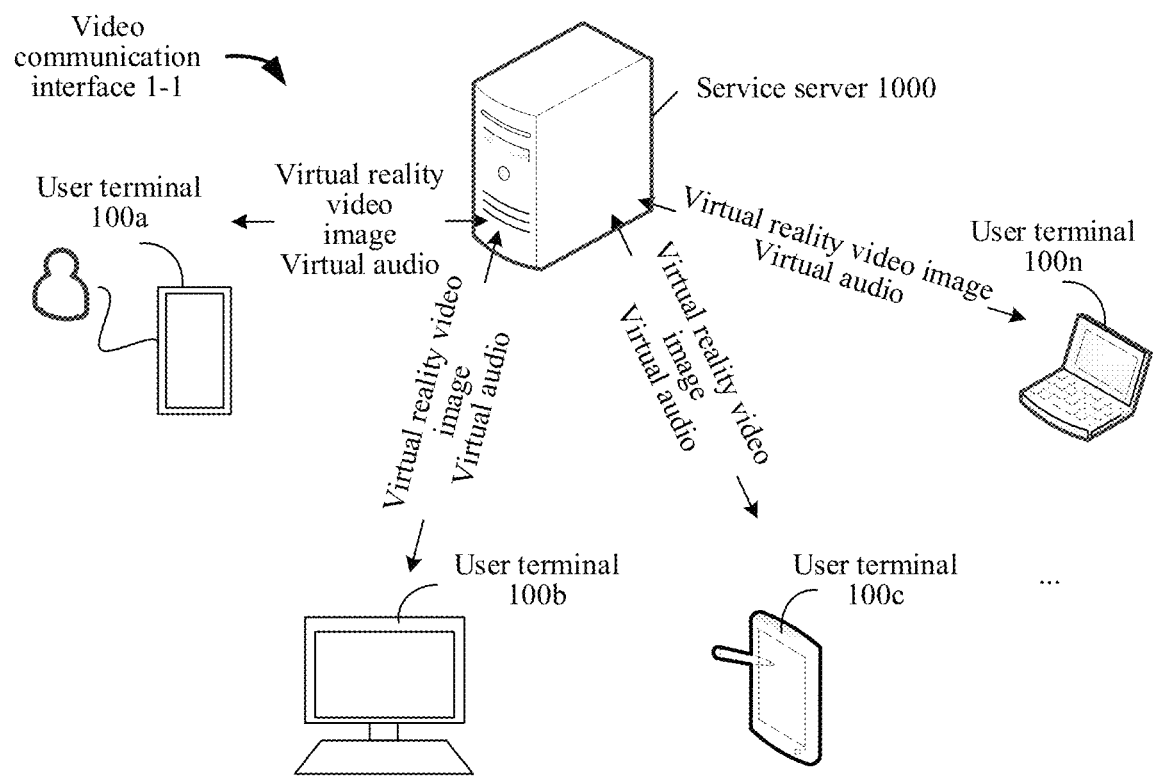
FIG. 1 is a diagram of a network architecture according to an embodiment of this application.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

A description is made on nouns and terms involved in the embodiments of this application, and the following explanations are applicable to the nouns and terms involved in the embodiments of this application.

1) AI is a theory, method, technology, and application system that uses a digital computer or a machine controlled by a digital computer to simulate, extend, and expand human intelligence, perceive the environment, acquire knowledge, and use knowledge to obtain an optimal result. That is, the AI is a comprehensive technology of computer sciences, is configured to determine essence of intelligence, and produces a new intelligent machine that can react in a manner similar to human intelligence. The AI is configured to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning (DL).

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The method for video communication provided in the embodiments of this application is a speech processing technology in the field of artificial intelligence.

2) Speech processing technology includes an automatic speech recognition technology (ASR), a speech synthesis technology (TTS), a voiceprint recognition technology, and the like. To make a computer capable of listening, seeing, speaking, and feeling is the future development direction of human-computer interaction, and speech interaction is one of the man-machine interaction manners in the future.

Generally, during video communication through smart terminals, the displayed video is usually the original audio and video data collected by a collection device. Therefore, the video display manner during video communication is dull, resulting in a poor video rendering effect during video communication. In addition, during video communication, if a user wants to display some virtual data (such as special effects animation), the video communication is required to be suspended to transmit the virtual data through a session page. Therefore, during the video communication, the normal operation and display of the video communication cannot be maintained when the virtual data is displayed.

Based on the above, the embodiments of this application provide a method, an apparatus, an electronic device, a computer-readable storage medium, and a computer program product for video communication, which can improve the video rendering effect during video communication, maintain the normal operation and display of the video communication when the virtual data is played during the video communication, and reduce the interactive operations during the video communication, thereby reducing the resource consumption caused by the interactive operations during the video communication.

FIG. 1 is a schematic diagram of a network architecture according to an embodiment of this application. As shown in FIG. 1, the network architecture is configured to implement a video communication system. The video communication system 1-1 may include a service server 1000 and a user terminal cluster. The user terminal cluster may include one or more user terminals, and a number of user terminals is not limited herein. As shown in FIG. 1, a plurality of user terminals may include a user terminal 100a, a user terminal 100b, a user terminal 100c, and a user terminal 100n; and the user terminal 100n may be connected to the service server

1000 through a network, so that each user terminal can exchange data with the service server 1000 through the network connection, so as to generate a virtual reality video image (referred to as a first virtual reality video image and/or a second virtual reality video image) and a virtual audio (referred to as a target virtual audio) during the video communication. Therefore, the video communication between at least two user terminals is implemented based on the virtual reality video image and the virtual audio.

It may be understood that, in each user terminal shown in FIG. 1, a target application may be installed. When the target application is run on each user terminal, data may be exchanged with the service server 1000 shown in FIG. 1, so that the service server 1000 can receive service data from each user terminal. The target application may include an application with a function of displaying data information such as text, images, audios, and videos. For example, the application may be an instant messaging application, which may be used for real-time communication between users. For example, when the instant messaging application is a video communication application, the user may perform video communication through the video communication application.

It may be understood that, in order to improve diversity of a user image when the user performs video communication in the instant messaging application (for example, a video communication application), the embodiments of this application provide one or more virtual objects in the instant messaging application. Two users about to perform video communication may select any virtual object, so as to engage in the virtual reality video communication. In the video communication system, each user logs into a client for video communication run on the user terminal with an account, so as to perform video communication with other users.

It may be understood that, the service server 1000 in this embodiment of this application may acquire service data according to the applications. For example, the service data may be a virtual object (for example, a cartoon character) selected by the user, voice data of the user, an expression of the user, and the like. For the acquired virtual object, the service server 1000 converts the acquired voice data of the user to a virtual audio based on the selected virtual object, so that the virtual audio has a configured timbre corresponding to the virtual object. Alternatively, the service server 1000 may fuse the acquired user expression with the selected virtual object to generate a virtual object with the user expression. Subsequently, the service server may transmit the virtual audio and the virtual object with the user expression to the user terminal. The user terminal may output a virtual reality video image including the virtual object with the user expression and the virtual audio in a video communication interface.

In this embodiment of this application, one of the plurality of user terminals may be selected as a target user terminal. The target user terminal may include smart terminals with a data processing function (such as a text data display function, a video data playback function, and a music data playback function), such as smart phone, a tablet computer, a notebook computer, a desktop computer, a smart television, a smart speaker, a desktop, a smart watch, or an on-board device, but this application is not limited thereto. For example, in this embodiment of this application, the user terminal 100a shown in FIG. 1 may be used as the target user terminal, and the above target application may be integrated in the target user terminal. In this case, the target user terminal may exchange data with the service server 1000 through the target application.

Exemplarily, when the user uses the target application (such as a video communication application) in the target user terminal, the user clicks/taps a virtual reality video communication control in the video communication application, so that the target user terminal receives a trigger operation on the virtual reality video communication control. At this time, the target user terminal may display at least one virtual object according to the trigger operation on the virtual reality video communication control. Subsequently, the user may select any virtual object from the at least one virtual object as a target virtual object. Then the service server may acquire the user expression of the user using the target user terminal, and fuse the user expression of the user with the target virtual object to generate a target virtual object with the user expression (for example, if the user expression is a pursed smile, a cartoon character with a pursed smile expression may be generated). Moreover, the service server may acquire an audio processing model corresponding to the target virtual object (the audio processing model includes a timbre feature corresponding to the target virtual object). The service server may acquire the voice data of the user, and convert the voice data to a virtual audio with the timbre feature of the target virtual object (for example, an audio with a timbre feature of the cartoon character) through the audio processing model. Subsequently, the service server may return the virtual audio and the target virtual object with the user expression to the target user terminal, so that the target user terminal can output a virtual reality video image including the target virtual object with the user expression and the virtual audio on the video communication interface.

It may be understood that the network architecture may include a plurality of service servers. One user terminal may be connected to one service server. Each service server may acquire service data (for example, a virtual object selected by a user, voice data of the user, and a user expression of the user) in the user terminal connected to the service server, convert the voice data of the user to a virtual audio with a timbre feature of the selected virtual object, and fuse the user expression with the virtual object to generate a virtual reality video image corresponding to the virtual object with the user expression.

It may be understood that, the user terminal may also the acquire service data (for example, the virtual object selected by the user, the voice data of the user, and the user expression of the user), convert the voice data of the user to a virtual audio with a timbre feature of the virtual object, and fuse the user expression with the virtual object to generate a virtual reality video image corresponding to the virtual object with the user expression.

It may be understood that the method for video communication provided in the embodiments of this application may be performed by an electronic device used for video communication. The electronic device includes but is not limited to a user terminal or a service server. A service server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The user terminal and the service server may be directly or indirectly connected in a wired or wireless communication manner. This is not limited in the embodiments of this application.

Figure 2:
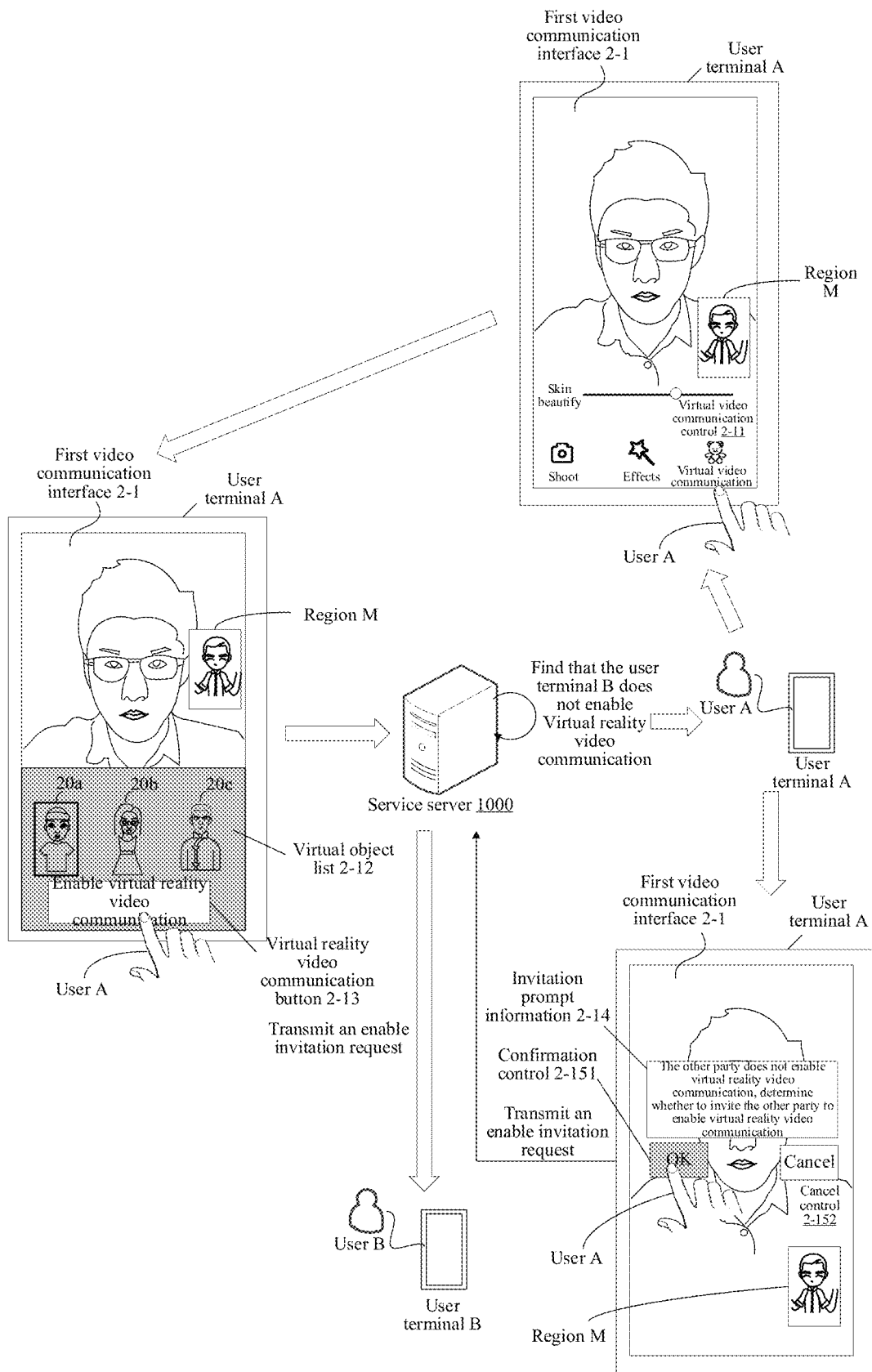
FIG. 2 to FIG. 3 are schematic diagrams of a scenario of engaging in virtual reality video communication according to an embodiment of this application.
Figure 3:
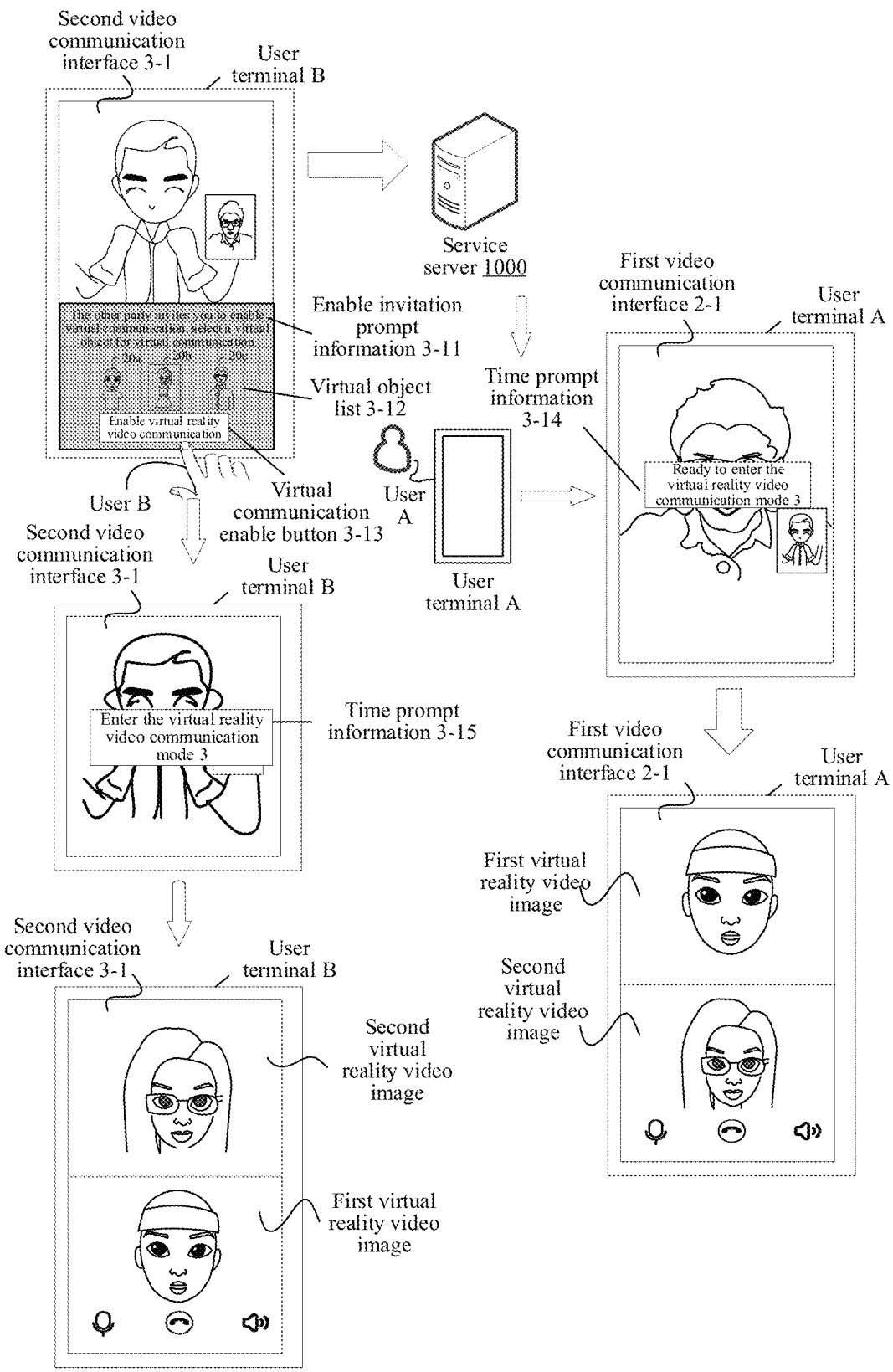

FIG. 2 to FIG. 3 are schematic diagrams of a scenario of engaging in virtual reality video communication according to an embodiment of this application. A service server shown in FIG. 2 to FIG. 3 may be the service server 1000 shown in FIG. 1, and a user terminal A shown in FIG. 2 to FIG. 3 may be any user terminal selected from FIG. 1. For example, the user terminal A may be the above user terminal 100b. A user terminal B shown in FIG. 2 to FIG. 3 may be any user terminal other than the user terminal A selected from the user terminal cluster in the embodiment corresponding to FIG. 1. For example, the user terminal B may be the above user terminal 100a.

A user A and a user B may perform video communication through the user terminal A through the user terminal B. FIG. 2 illustrates video communication performed on the side of the user terminal A corresponding to the user A. A first video communication interface 2-1 includes a virtual reality video communication control 2-11 (for example, in a display form of an icon and text "virtual reality video communication") for the user A and the user B to engage in the virtual reality video communication through the virtual reality video communication control 2-11. For example, as shown in FIG. 2, a control corresponding to the virtual reality video communication, that is, the virtual reality video communication control 2-11 is displayed at a bottom of the first video communication interface 2-1 of the user terminal A. The user A may click/tap the virtual reality video communication control 2-11. After the user A clicks/taps the virtual reality video communication control 2-11, the user terminal A may display a virtual object list 2-12 (referred to as at least one virtual object) on the first video communication interface 2-1 in response to the trigger operation performed by the user A, and the user A may select a virtual object from the virtual object list 2-12 as a target virtual object. The virtual object list 2-12 may be displayed in the bottom region of the first video communication interface 2-1 in a form of a floating window, a form of an obscured layer, or a translucent form, or may be displayed on a retractable interface whose display size may be changed through a drag-and-drop operation. The size of the interface is less than that of the first video communication interface 2-1.

It may be understood that, when the virtual object list 2-12 is displayed, a display region where the user B or the user A is displayed in a form of a small window is moved to a region that does not overlap the display region of the virtual object list 2-12. That is to say, the display region of the user B or the user A is not covered by the display region of the virtual object list 2-12. For example, as shown in FIG. 2, when the virtual object list 2-12 is displayed, a region M where the user B is displayed is moved up on the first video communication interface 2-1, and the region M does not overlap the display region of the virtual object list.

As shown in FIG. 2, the virtual object list 2-12 includes a virtual object 20a, a virtual object 20b, and a virtual object 20c. After selecting the virtual object 20a, the user A may click/tap a virtual reality video communication button enable 2-13. The user terminal A may generate a virtual communication enable request and transmit the enable request to the service server 1000 in response to the enable operation performed by the user A. The service server 1000 may query whether the user terminal B belonging to the user B that performs video communication with the user A enables the virtual reality video communication. If the user terminal B does not enable the virtual reality video communication (that is, the user B does not enable the virtual reality video communication), the service server 1000 may return the query result to user terminal A (the user terminal B does not enable the virtual reality video communication). The user terminal A may display invitation prompt information 2-14 on the first video communication interface 2-1, and the user A may view the invitation prompt information 2-14. The invitation prompt information 2-14 may be displayed in any region of the first video communication interface 2-1 in a form of a pop-up window, a form of an obscured layer, or a translucent form. For example, as shown in FIG. 2, the invitation prompt information 2-14 is displayed on the first video communication interface 2-1 in the form of a pop-up window. The pop-up window includes the invitation prompt information 2-14 "The other party has not enabled the virtual reality video communication, invite the other party to enable the virtual reality video communication?". Moreover, as shown in FIG. 2, the pop-up window including the invitation prompt information 2-14 further includes a confirmation control 2-151 and a cancel control 2-152, so that the user A can determine whether to transmit the invitation to the user B to enable the virtual reality video communication. If the user A clicks/taps the confirmation control 2-151, the user terminal A transmits an enable invitation request corresponding to the confirmation result to the service server, so that the service server 1000 transmits the enable invitation request to the user terminal B. If the user A clicks/taps the cancel control 2-152, the service server 1000 does not transmit the enable invitation request (referred to as the enable request) to the user terminal B. It may be understood that, when the invitation prompt information 2-14 is displayed, a display region where the user B or the user A is displayed in a form of a small window is moved to a region that does not overlap the display region of the invitation prompt information 2-14. That is to say, the display region of the user B or the user A is not covered by the display region of the invitation prompt information 2-14. For example, as shown in FIG. 2, when the invitation prompt information 2-14 is displayed, the region M where the user B is displayed is moved to a right upper corner of the first video communication interface 2-1, and the region M does not overlap the display region of the invitation prompt information.

As shown in FIG. 2, for the invitation prompt information 2-14, the user A clicks/taps the confirmation control 2-151 to invite the user B to enable the virtual reality video communication. The user terminal A may generate the enable invitation request in response to the confirmation operation performed by the user A, and transmit the enable invitation request to the service server 1000. Therefore, after receiving the enable invitation request, the service server forwards the enable invitation request to the user terminal B. As shown in FIG. 3, the user B may view the invitation prompt information 3-11 corresponding to the enable invitation request on a second video communication interface 3-1 of the user terminal B and display a virtual object list 3-12. After selecting a virtual object, the user B may click/tap a virtual communication enable button 3-13. The user terminal B may generate a virtual reality video communication enable request and transmit the enable request to the service server 1000 in response to the enable operation performed by the user B. Since the user terminal A has enabled the virtual reality video communication, the service server 1000 may transmit, to the user terminal A, a notification message indicating that the user terminal B has enabled the virtual reality video communication. After receiving the notification message, the user terminal A may display a countdown prompt information 3-14 (e.g., time prompt information 3-14) on the first video communication interface 2-1 to prompt the user A that the user B has enabled the virtual reality video communication. After a waiting duration (for example, 3s), the user A and the user B engage in the virtual reality video communication.

Similarly, the user terminal B may further display time prompt information 3-15 on the second video communication interface 3-1, to prompt the user B that after the waiting duration (for example, 3s), the user B and the user A will engage in the virtual reality video communication. In this embodiment of this application, the waiting duration may be presented on the first video communication interface 2-1 and the second video communication interface 3-1 in a form of countdown.

It may be understood that, during the virtual reality video communication, the service server 1000 may acquire the virtual object 20a selected by the user A, and acquire expression data of the user A, and then the service server 100 fuse the expression data of the user A with the virtual object 20a, so as to generate a first virtual reality video image including the virtual object 20a (the virtual object 20a has the expression of the user A). Similarly, the service server 1000 may acquire the virtual object 20b selected by the user B, and acquire expression data of the user B, and then the service server 1000 may fuse the expression data of the user B with the virtual object 20b, so as to generate a second virtual reality video image including the virtual object 20b (the virtual object 20b has the expression of the user B). Subsequently, the service server may transmit the first virtual reality video image and the second virtual reality video image to the user terminal A and the user terminal B respectively, so that the user terminal A and the user terminal B can display the first virtual reality video image and the second virtual reality video image on respective video communication interfaces. That is to say, the user A can see, on the first video communication interface of the user terminal A, that two virtual objects (the virtual object 20a and the virtual object 20b) are performing video communication, and the user B can see, on the second video communication interface of the user terminal B, that two virtual objects (the virtual object 20b and the virtual object 20a) are performing video communication.

During the virtual reality video communication, the service server 1000 may further acquire voice data respectively corresponding to the user A and the user B, and the service server 1000 may perform voice conversion on the voice data of the user A (referred to as first voice data), to generate a virtual audio a (referred to as a first virtual audio) having a timbre feature of the virtual object 20a, and transmit the virtual audio a to the user terminal B. Likewise, the service server 1000 may perform voice conversion on the voice data of the user B (referred to as second voice data), to generate a virtual audio b (referred to as a second virtual audio) having a timbre feature of the virtual object 20b, and transmit the virtual audio b to the user terminal A. The user terminal A may output the virtual audio b on the first video communication interface, so that the user A can see the second virtual reality video image of the virtual object 20b including the expression of the user B, and hear a sound of the user B with the timbre feature of the virtual object 20b. Likewise, the user terminal B may output the virtual audio A on the second video communication interface, so that the user B can see the first virtual reality video image of the virtual object 20a including the expression of the user A, and hear a sound with the timbre feature of the virtual object 20a.

It may be understood that, the entrance to the virtual reality video communication is added to the video communication interface, and the users can select the virtual objects on the video communication interface, so that the chat images of the users can be converted to virtual images. In this way, the diversity of the user images during the video communication is improved, and the video communication can be operated and displayed normally when the virtual images are displayed. Moreover, during virtual reality video chatting, sounds of the other parties heard by the users are virtual audios after voice conversion, which are not original sounds of the users but the virtual audio with the timbre features of the virtual objects. In addition, in the embodiments of this application, the sounds and the images of the communication users during the video communication are changed, so that more interest and video display manners are realized during the video communication, and the quality of the video communication can be effectively improved, thereby effectively improving the user experience.

Figure 4:
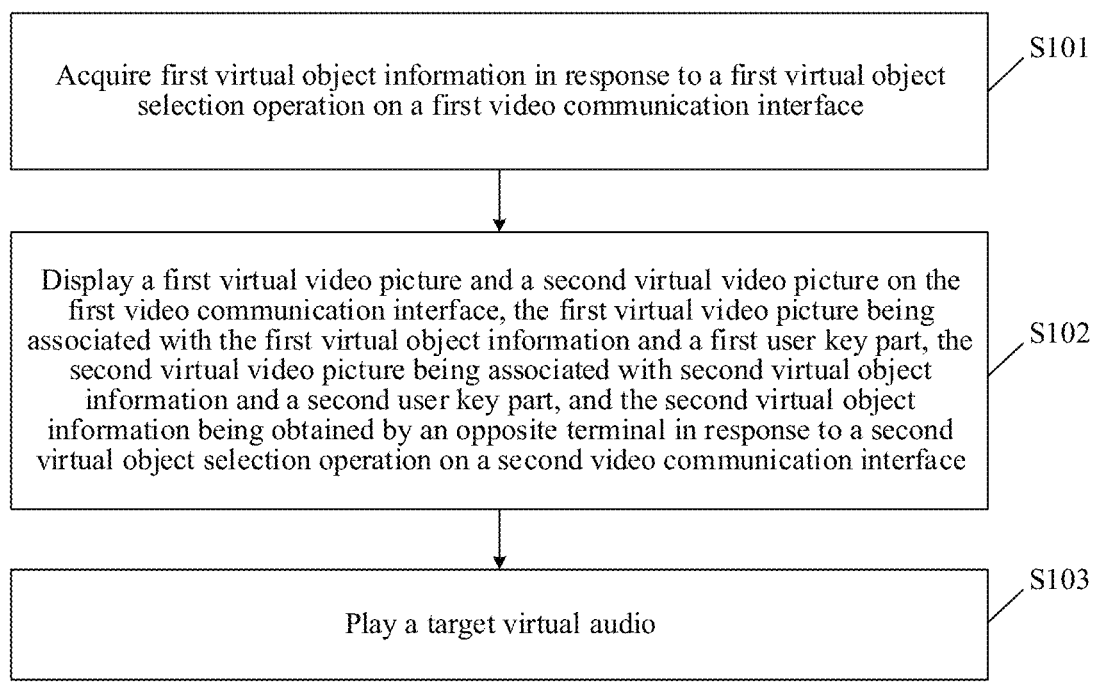
FIG. 4 is a schematic flowchart of a method for video communication according to an embodiment of this application.

FIG. 4 is a schematic flowchart of a method for video communication according to an embodiment of this application. The method for video communication may be performed by a user terminal (for example, the above user terminal shown in FIG. 1 and FIG. 2) or a service server (for example, the above service server 1000 shown in FIG. 1), or may be jointly performed by the user terminal and the service server. For ease of understanding, in this embodiment of this application, the method for video communication is performed by the above user terminal, for example. The method for video communication may include at least the following steps S101-S103. The steps are described below.

S101: Obtain first virtual object information in response to a first virtual object selection operation on a first video communication interface.

In this embodiment of this application, the first video communication interface includes a virtual reality video communication control configured to trigger virtual reality video communication, so that a user (referred to as a first user, such as a user A) can click/tap the virtual reality video communication control, thereby performing virtual reality video communication with a communication user (referred to as a second user, such as a user B). When the user clicks/taps the virtual reality video communication control, a first terminal (referred to as an electronic device for video communication) triggers the processing of the virtual reality video communication.

When the first user clicks/taps the virtual reality video communication control, the first terminal displays at least one virtual object in response to the trigger operation performed by the first user on the virtual reality video communication control. The virtual object may be a virtual image different from a real character image. For example, the virtual object may be a three-dimensional animation image (including an animated character image (such as a cartoon character image), an animated animal image (such as a cartoon animal image), or an animated plant figure (such as an animated apple tree image), and the like). The first user may select a virtual object from the at least one virtual object as a virtual object for image conversion. When the first user selects a virtual object from the at least one virtual object, the first terminal acquires the virtual object selected by the first user and determines information corresponding to the virtual object as the first virtual object information in response to the first virtual object selection operation performed by the first user on the at least one virtual object. The information corresponding to the virtual object includes a virtual object model, a virtual audio model, and the like.

The first video communication interface is an interface for video communication between an electronic device and a second terminal of the electronic device. The first video communication interface is a video communication interface displayed on the side of the electronic device, and the second terminal of the electronic device is a second terminal used by the second user. In addition, the first video communication interface may alternatively be at least one virtual object displayed when the electronic device receives a request for virtual reality video communication, which is not limited in this embodiment of this application.

It may be understood that, since the at least one virtual object is added to the video communication, a character image in original data collected by a video capture device can be switched to the image of the selected virtual object based on the virtual object selected by the user, so that the video communication is realized in the form of virtual reality video communication, which improves the video rendering effect during the video communication.

S102: Display a first virtual reality video image and a second virtual reality video image on the first video communication interface, the first virtual reality video image being associated with the first virtual object information and a first user feature, the second virtual reality video image being associated with second virtual object information and a second user feature, and the second virtual object information being obtained by the second terminal in response to a second virtual object selection operation on a second video communication interface.

In this embodiment of this application, when the first user selects a virtual object and enables the virtual reality video communication function, if the second user that performs video communication with the first user does not enable the virtual reality video communication function, the first user and the second user will not perform the virtual reality video communication. After the first user enables the virtual reality video communication function, the first terminal may transmit, to the second user, invitation information for enabling the virtual reality video communication, to prompt the second user to enable the virtual reality video communication function. That is to say, after selecting the virtual object, the first user may enable the virtual reality video communication by clicking/tapping. The first terminal may display the invitation prompt information on the first video communication interface in response to the enable operation on the virtual reality video communication control. The invitation prompt information is enable invitation information for the virtual reality video communication control, and the enable invitation information is a prompt message indicating that the first terminal requests the second terminal to enable the virtual reality video communication control. That is to say, the invitation prompt information is used for prompting the first user to transmit the enable invitation information for the virtual reality video communication control to the second user. The first user may click/tap an invitation confirmation control in response to the invitation prompt information. At this time, the first terminal may transmit an enable request for the virtual reality video communication control to the second terminal in response to the first confirmation operation performed by the first user on the invitation prompt information.

After receiving the enable request, the second terminal may display enable prompt information on the second video communication interface of the second terminal, so that the second user can view the enable prompt information and enable the virtual reality video communication. At this time, the second terminal receives an enable operation performed by the second user on the virtual reality video communication. In response to the enable operation performed by the second user on the virtual reality video communication, the second terminal returns, to the first terminal, confirmation information indicating that the second user enables the virtual reality video communication. The first terminal may receive the confirmation information returned by the second terminal for the enable request, and output time prompt information. The time prompt information is used for prompting a waiting duration for the first user to engage in the virtual reality video communication. When a time corresponding to the waiting duration is reached, the first terminal outputs the first virtual reality video image and the second virtual reality video image on the first video communication interface.

The first user and the second user both need to enable the virtual reality video communication before engaging in the virtual reality video communication. Before the virtual reality video communication, a preparation time (the waiting duration) exists. The waiting duration may be 3 seconds, 1 minute, 1 hour, or the like, which is not enumerated herein. When the time corresponding to the waiting duration is reached, the first user and the second user will engage in the virtual reality video communication. During the virtual reality video communication, the first virtual reality video image for displaying (e.g., covering) a user feature of the first user and the second virtual reality video image for displaying (e.g., covering) a user feature of the second user are presented on the first video communication interface. The first virtual reality video image is a virtual reality video image generated from the user feature (referred to as a first user feature) of the first user, and the second virtual reality video image is a virtual reality video image generated from the user feature (referred to as a second user feature) of the second user. The user feature may be parts of the user such as eyes, lips, a nose, or eyebrows. The user feature may be used for representing expression information (for example, a smile expression, a pursed smile expression, an open mouth expression, or a wide-eyed and open-lipped expression) of the user (for example, the first user and the second user).

In this embodiment of this application, the first virtual object information includes a first virtual object model, and the second virtual object information includes a second virtual object model. The process of outputting the first virtual reality video image and the second virtual reality video image includes: acquiring, by the first terminal, a first virtual feature from the first virtual object model, and acquiring the first user feature of the first user, the first virtual feature and the first user key part of the first user belonging to a same part type. For example, if the user key part of the first user is the eye part, the first virtual key part in the first virtual object model is correspondingly the eye part. Subsequently, the first terminal outputs the first virtual reality video image including the first virtual object model on the first video communication interface according to the first virtual feature and the user feature of the first user, the first virtual feature of the first virtual object model being associated with the user feature of the first user. Likewise, the first terminal acquires a second virtual feature from the second virtual object model, and acquires the second user feature of the second user, the second virtual feature and the second user feature of the second user belonging to a same part type. The second virtual reality video image including the second virtual object model may be outputted on the first video communication interface according to the second virtual feature and the user feature of the second user, the second virtual feature of the second virtual object model being associated with the user feature of the second user.

The process of outputting the virtual reality video image by the first terminal according to the user feature and the virtual feature in the virtual object model is described below. A description is provided by using the example that the first terminal outputs the first virtual reality video image according to the user feature of the first user and the first virtual feature (a specific implementation of outputting the first virtual reality video image according to the user feature of the second user and the second virtual feature may be the same).

In this embodiment of this application, the first terminal first acquires a virtual action state of the first virtual feature and a part action state corresponding to the user feature of the first user. The virtual action state corresponds to two states: a first state and a second state. In the first state, the first virtual feature corresponds to first model position coordinates, and in the second state, the second virtual feature corresponds to second model position coordinates. The first terminal determines a relationship between the state and the position coordinates according to the first state and the first model location coordinates, and the second state and the second model location coordinates, and then determines position coordinates corresponding to the first virtual feature in the part action state based on the relationship between the state and the position coordinates, that is, obtains target model position coordinates. When the first terminal adjusts the first virtual feature in the first virtual object model to the target model position coordinates, the virtual action state corresponding to the first virtual feature is adjusted to an action state that matches the part action state. At this time, the first virtual object model is converted to a first target virtual object model. Subsequently, the first terminal outputs the first virtual reality video image including the first target virtual object model on the first video communication interface. In addition, the virtual feature in the first target virtual object model is in the part action state.

Figure 5A:
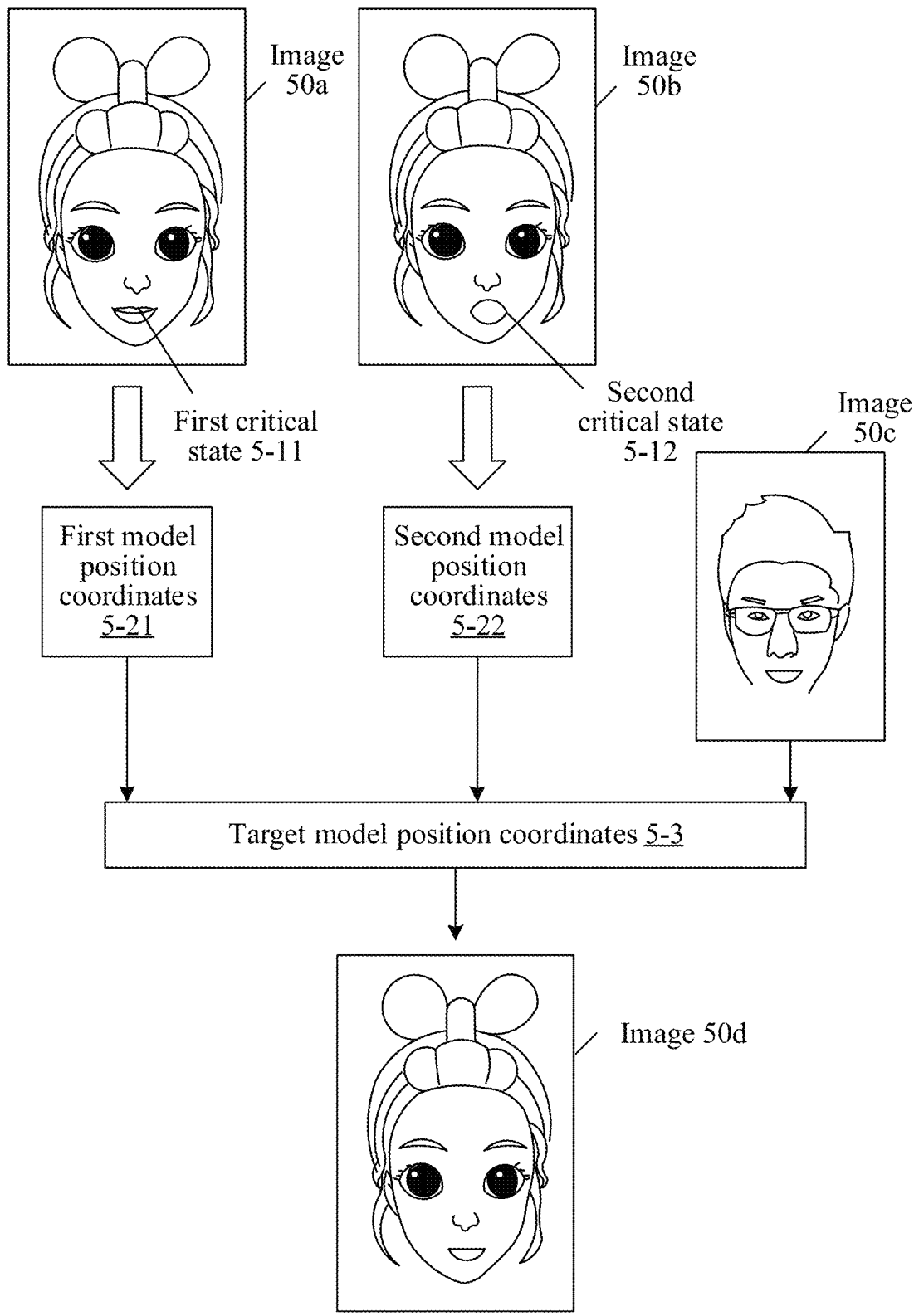
FIG. 5A is a schematic diagram I of generating a virtual reality video image according to an embodiment of this application.

Exemplarily, FIG. 5A is a schematic diagram I of generating a virtual reality video image according to an embodiment of this application. In the schematic diagram shown in FIG. 5A, the virtual feature is a lip part, and the user feature is a lip part, for example.

As shown in FIG. 5A, an image when the virtual action state of the virtual feature (for example, the virtual lip part) in the first virtual object model is a first state 5-11 may be an image 50a. The first state 5-11 may mean that the virtual lip part is in a lip-closed state (at this time, an expression value of the first virtual object model is 0). An image when the virtual action state of the virtual lip part in the second virtual object model is a second state 5-12 may be an image 50b. The second state 5-12 may mean that the lip part is in a lip-wide-opened state (at this time, the expression value of the first virtual object model is 1). The first terminal may acquire first model position coordinates 5-21 (that is, model position coordinates corresponding to the virtual lip part when the expression value is 0) corresponding to the first virtual feature in the first virtual object model when the virtual lip part is in the lip-closed state. The first terminal may further acquire second model position coordinates 5-22 (that is, model position coordinates corresponding to the virtual lip part when the expression value is 1) corresponding to the first virtual feature in the first virtual object model when the virtual lip part is in the lip-wide-opened state.

The first terminal may further acquire a user image captured by a camera during the video communication. The part action state of the user lip part (that is, the user feature of the first user) of the first user may be acquired from an image 50c of the user image. As shown in FIG. 5, the user lip part of the first user is in a lip-half-opened smile state, that is, the current part action state is a lip-half-opened smile state. The first terminal may determine an expression value (for example, the expression value is 0.3) when the part action state is the lip-half-opened smile state, may determine target model position coordinates 5-3 corresponding to the expression value 0.3 according to the first model position coordinates 5-21 corresponding to the expression value 0 and the second model position coordinates 5-22 corresponding to the expression value 1, and may adjust the virtual action state of the virtual lip part in the virtual object model according to the target model position coordinates 5-3. That is to say, the virtual lip part in the virtual object model may be adjusted to the lip-half-opened smile state, so that an image 50d in the virtual reality video image can be generated. An expression of a virtual object in the image 50d is consistent with the user expression.

Another processing procedure of outputting the first virtual reality video image by the first terminal is described below. The first terminal acquires key point two-dimensional coordinates corresponding to the user feature of the first user, determines the key point three-dimensional coordinates corresponding to the first virtual feature according to the key point two-dimensional coordinates, determines a target virtual action state corresponding to the first virtual feature according to the key point three-dimensional coordinates, and outputs the first virtual reality video image including a second target virtual object model on the first video communication interface. The first virtual feature in the target virtual object model is in the target virtual action state. That is to say, the first terminal acquires a position mapping relationship between the first user feature and the first virtual feature, adjusts the state of the first virtual feature to a part action state of the first user feature according to the position mapping relationship in the first virtual object model, to obtain the second target virtual object model, and outputs the first virtual reality video image including the second target virtual object model on the first video communication interface. In this way, the first terminal can directly map a feature position corresponding to the first user feature to the virtual object model. By detecting a change of the feature position and mapping the change to a model position of the first virtual object model, the expression of the first virtual object model can be changed with the user expression.

Figure 5B:
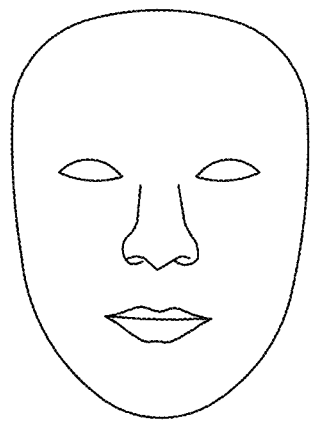
FIG. 5B is a schematic diagram II of generating a virtual reality video image according to an embodiment of this application.
Figure 5B:
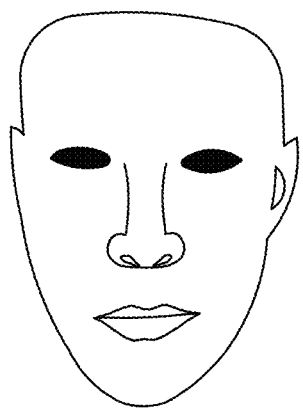
Figure 5B:
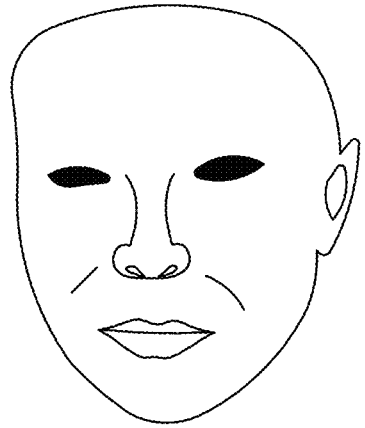
Figure 5B:
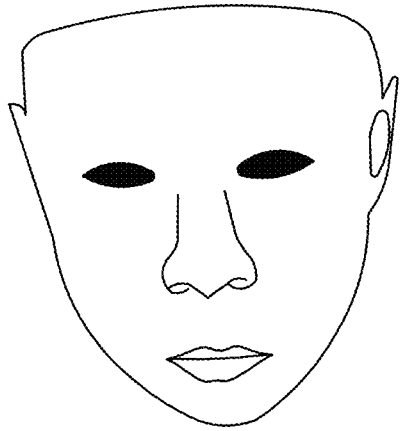

Exemplarily, FIG. 5B is a schematic diagram II of generating a virtual reality video image according to an embodiment of this application. As shown in FIG. 5B, when the part action state corresponding to the first user feature is mapped to an image 5-41 corresponding to the first virtual feature, virtual reality video images such as images 5-42 to 5-44 are obtained.

In this embodiment of this application, an implementation in which the user terminal (including the first terminal and the second terminal) outputs the virtual reality video image may be implemented by a real-time rendering component in the user terminal. The real-time rendering component may be a component with an image rendering capability. For example, the real-time rendering component may be a real-time 3 dimensions (3D) engine, such as an "Ace3D" engine. The "Ace3D" engine may be deployed in the camera application in the user terminal, which has a fast loading speed, a small memory footprint, and high compatibility, and may be used for hair rendering, 3D animation expression rendering, and the like.

S103: Play a target virtual audio.

The target virtual audio includes one or both of a first virtual audio or a second virtual audio, the first virtual audio being associated with first voice data and the first virtual object information, and the second virtual audio being associated with second voice data and the second virtual object information. The first voice data is the voice data of the first user, and the first terminal may convert the second voice data to a second virtual audio. The second voice data is the voice data of the second user, and the first terminal may receive the second virtual audio converted by the second terminal based on the second voice data.

In this embodiment of this application, when the first user speaks, the target virtual audio includes the first virtual audio. At this time, the first terminal synchronously plays the target virtual audio and the first virtual reality video image. When the second user speaks, the target virtual audio includes the second virtual audio. At this time, the first terminal synchronously plays the target virtual audio and the second virtual reality video image. When the first user and the second user both speak, the target virtual audio includes the first virtual audio and the second virtual audio. At this time, the first terminal synchronously plays the target virtual audio and the first virtual reality video image, and synchronously plays the target virtual audio and the second virtual reality video image.

In this embodiment of this application, after the first user and the second user engage in the virtual reality video communication, the first terminal may collect the voice data of the first user to obtain the first voice data, and convert the first voice data to a virtual communication audio associated with the first virtual object information selected by the first user, to obtain the first virtual audio. In addition, the first terminal may further collect data about the user feature of the first user, and transmit the first virtual audio and the user feature of the first user to the second terminal, so that the second terminal can generate a first virtual reality video image according to the user feature of the first user, and output the first virtual audio and the target virtual reality video image synchronously.

Likewise, the second terminal may collect the voice data of the second user to obtain the second voice data, and convert the second voice data to a virtual communication audio associated with the second virtual object information selected by the second user, to obtain the second virtual audio. In addition, the second terminal may further collect data about the user feature of the second user, and transmit the second virtual audio and the user feature of the second user to the first terminal, so that the first terminal can generate a second virtual reality video image according to the user feature of the second user, and output the second virtual audio and the virtual reality video image synchronously.

The process of converting the user's voice data to a virtual audio is described below by using an example that the first terminal converts the voice data of the first user to the first virtual audio associated with the first virtual object information.

In this embodiment of this application, the process in which the first terminal converts the first voice data to the first virtual audio associated with the first virtual object information includes: performing, by the first terminal, voice preprocessing on the voice data to obtain transition voice data, and inputting the transition voice data to an audio processing model. An audio feature of the transition voice data can be extracted through the audio processing model. The audio processing model is an audio processing model included in the first virtual object information. The audio processing model includes a timbre feature of the first virtual object model (the virtual object model included in the first virtual object information). For example, if the first virtual object model is a cartoon character A model, the audio processing model includes a timbre feature of the cartoon character A model. The first terminal may acquire the timbre feature included in the audio processing model, the timbre feature being associated with the first virtual object model. Subsequently, the first terminal may fuse the audio feature with the timbre feature, so as to obtain a fused audio feature. The first virtual audio may be generated according to the fused audio feature.

In this embodiment of this application, the audio processing model may be a model that has a voice changing capability. For example, the audio processing model may be a real-time AI voice-changing model. The real-time AI voice-changing model may extract content information in the user's voice data (for example, rhythm feature data and emotional characteristic data of the voice data), and then may perform conversion in combination with the timbre feature of the virtual object, so that a sound of the model virtual object can be reproduced. Through the real-time AI voice-changing model, not only the realistic timbre conversion between the sound of the user and the sound of the virtual object can be realized, but also the features such as a speech rate, pause, emotion, and a speech mode of the user can be realistically reflected through the virtual object.

Figure 6:
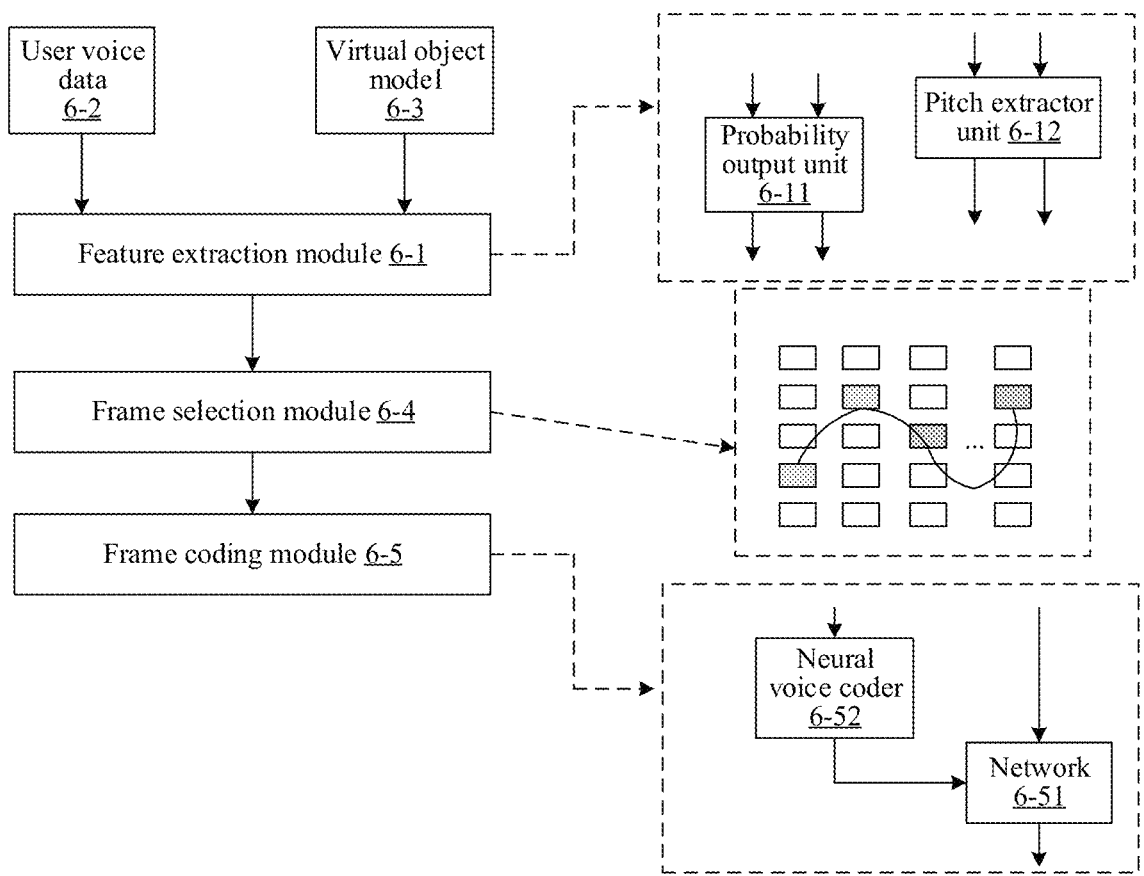
FIG. 6 is a schematic diagram of a module for converting voice data to a virtual audio according to an embodiment of this application.

FIG. 6 is a schematic diagram of a module for converting voice data to a virtual audio according to an embodiment of this application. As shown in FIG. 6, an audio feature of user voice data 6-2 and a timbre feature of a virtual object model 6-3 may be extracted through a feature extraction module 6-1 (for example, a phoneme posterior probability of the voice data may be outputted through a probability output unit (SI-DNN unit) 6-11 in the feature extraction module 6-1, and the phoneme posterior probability is used as the audio feature). A pitch extractor unit 6-12 in the feature extraction module 6-1 may be configured to extract a pitch feature (F0x) corresponding to the user voice data 6-2 and a pitch feature (F0y) corresponding to the virtual object model 6-3. Then, the features extracted by the feature extraction module 6-1 may be input to a frame selection module 6-4. A target spectrum and an F0 path mat be determined through the frame selection module 6-4 (the target spectrum and the F0 path may be determined based on the Viterbi-based search with the minimum dynamic difference). Subsequently, final virtual audio can be output through a feature coding module 6-5 (the final determined spectral trajectory and F0 trajectory may be sent to a neural voice coder 6-52 that is based on an "LPC" network 6-51, and the virtual audio may be generated through the neural voice coder 6-52).

The above is an exemplary description of the specific process in which the audio processing model is a real-time AI model and the voice data is converted to the virtual audio through the real-time AI voice-changing model. For the audio processing model. The audio processing model may be other models capable of voice conversion, which is not limited in this embodiment of this application.

In this embodiment of this application, the process of performing voice preprocessing on the first voice data to obtain the transition voice data in the process in which the first terminal converts the first voice data to the first virtual audio associated with the first virtual object information may include the following steps: determining, by the first terminal, echo audio data from the first voice data, and deleting the echo audio data from the first voice data to obtain echo transition voice data; determining, by the first terminal, noise audio data from the echo transition voice data, and suppressing the noise audio data in the echo transition voice data to obtain noise transition voice data; and determining, by the first terminal, mute audio data from the noise transition voice data, and deleting the mute audio data from the noise transition voice data to obtain the transition voice data. During the voice processing, alternatively, the noise audio data may be deleted first, then the mute audio data may be deleted, and finally the echo audio data may be deleted. Alternatively, the three operations may be performed simultaneously. The order between the three operations is not limited in this embodiment of this application.

In this embodiment of this application, the first terminal may acquire the key user part of the second user sent by the second terminal, and generate a second virtual reality video image according to the key user part of the second user. In addition, the first terminal may acquire the second virtual audio sent by the second terminal. Subsequently, the first terminal may output, on the first video communication interface, the second virtual audio synchronized with the second virtual reality video image. The first terminal may acquire a second image timestamp corresponding to the second virtual reality video image and a second voice timestamp corresponding to the second virtual audio; acquire, from the second voice timestamp, a second target voice timestamp in a time matching relationship with the second image timestamp; and acquire, from the second virtual audio, a second to-be-output virtual audio corresponding to the target voice timestamp, and output the second virtual reality video image and the second to-be-output virtual audio synchronously. Likewise, when the first terminal plays the first virtual voice and the first virtual reality video image synchronously, the first terminal may acquire a first image timestamp corresponding to the first virtual reality video image and a first voice timestamp corresponding to the first virtual audio; acquire, from the first voice timestamp, a first target voice timestamp in a time matching relationship with the first image timestamp; and acquire, from the first virtual audio, a first to-be-output virtual audio corresponding to the target voice timestamp, and output the first virtual reality video image and the first to-be-output virtual audio synchronously.

It may be understood that, in this embodiment of this application, since the virtual object is added to the video communication application, the video data collected by the video capture device can be converted to the video image corresponding to the image of the selected virtual object and the virtual voice corresponding to the selected virtual object based on the virtual object selected by the user, thereby realizing the virtual reality video communication. That is to say, in this embodiment of this application, during the video communication performed by the user, the user image in the original video data can be converted to the virtual image for communication, and the virtual image of the user can be displayed without a need to suspend the video communication. In addition, during the video communication performed by the user, the played audio is the virtual audio, which is the timbre of the selected virtual object rather than the original voice data of the user. Therefore, the quality of video communication can be improved.

It may be further understood that, in this embodiment of this application, the images of the users in the video communication application are enriched, so that the virtual reality video communication between users can be performed, and the normal operation and display of the video communication between the users can be maintained when the virtual data is displayed. In addition, during the virtual reality video communication, the user voice data is converted to the virtual audio for output, which can improve the quality of the video communication. That is to say, in this embodiment of this application, more video display manners and interest can be realized during the video communication, and the normal operation and display of the video communication can be maintained while displaying the virtual data, thereby improving the quality of the video communication.

Figure 7:
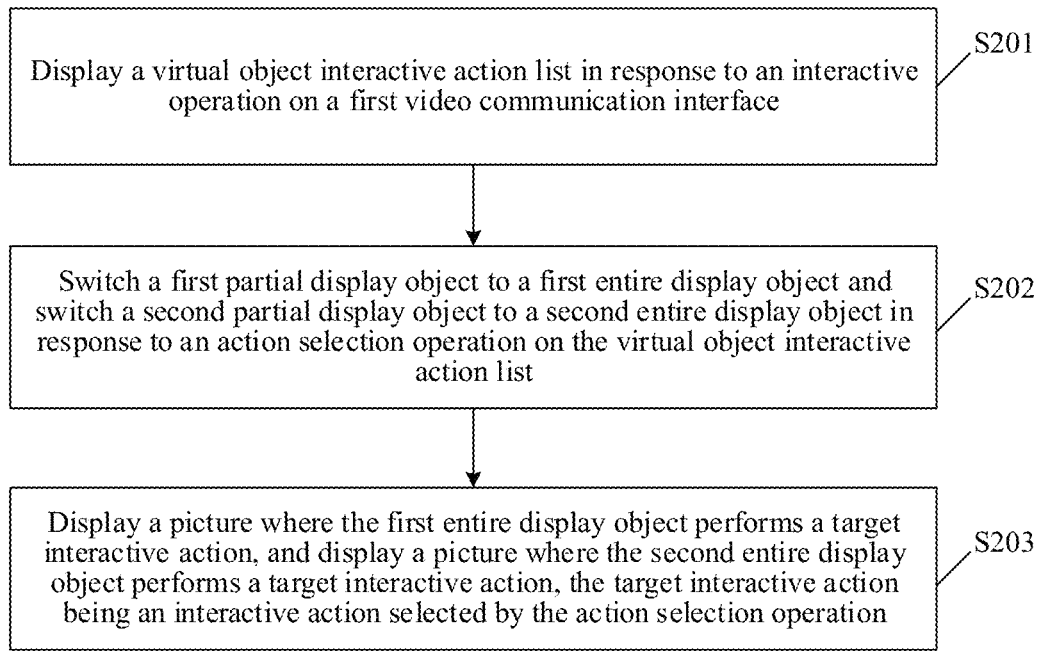
FIG. 7 is a schematic flowchart of interaction during virtual reality video communication according to an embodiment of this application.

In this embodiment of this application, during the virtual reality video communication between the users, the first terminal and the second terminal may select an interactive action for interaction. FIG. 7 is a schematic flowchart of interaction during virtual reality video communication according to an embodiment of this application. The process shown in FIG. 7 is described by using the first terminal and the first user as an example. In the process, the virtual object model displayed in the first virtual reality video image and associated with first virtual object information is a first partial display object, and the virtual object model displayed in the second virtual reality video image and associated with the second virtual object is a second partial display object, for example.

S201: Display a virtual object interactive action list in response to an interactive operation on the first video communication interface.

In this embodiment of this application, the interactive action may include dancing, touching the head, hugging, and the like, which is not enumerated herein. The first video communication interface includes an interaction control. When the first user triggers the interaction control through an operation such as clicking/tapping, the first terminal receives the interactive operation. At this time, the first terminal displays the virtual object interactive action list in response to the interactive operation, so as to select an interactive action from the virtual object interactive action list for interaction with the second user. That is to say, the first terminal may display the virtual object interactive action list on the first video communication interface for selection by the first user in response to the operation of triggering the interaction control by the first user.

S202: Switch the first partial display object to a first full display object and switch the second partial display object to a second full display object, in response to an action selection operation on the virtual object interactive action list.

In this embodiment of this application, after the first user selects an interactive action, the first terminal may switch the first partial display object corresponding to the first user to the first full display object on the first video communication interface in response to the trigger operation performed by the first user on the first user. The partial display object may be an object including a partial region of the virtual object. For example, when the virtual object is a virtual character image, the partial display object may be an object that includes only a head region, a neck region, a body region, or a foot region of the virtual object, for example, the virtual object model shown in the first virtual reality video image in FIG. 3. The first virtual reality video image shows the first partial display object, which includes only a head region of the virtual object 20a. The first full display object may be an object including the whole region of the virtual object. For example, when the virtual object is a virtual character image, the first full display object may be understood as an object including a head region, a neck region, a body region, and a foot region.

S203: Display a image where the first full display object performs a target interactive action, and display a image where the second full display object performs a target interactive action, the target interactive action being an interactive action selected by the action selection operation.

In this embodiment of this application, the first terminal generates, based on the interactive action selected by the user (referred to as the target interactive action), a first virtual reality video image including the first full display object performing the interactive action selected by the first user. For example, if the interactive action selected by the first user is a dancing action, the first full display object presented in the first virtual reality video image will perform the dancing action, and the second full display object presented in the second virtual reality video image will perform the dancing action. The first user and the second user can respectively see the virtual reality video image in which the first full display object is dancing and the virtual reality video image in which the second full display object is dancing.

In this embodiment of this application, each interactive action corresponds to an action execution duration. When a time corresponding to the action execution duration of the interactive action is reached, the first terminal restores the virtual object model presented in the first virtual reality video image and associated with the first virtual object information from the first full display object to the first partial display object, and restores the virtual object model presented in the first virtual reality video image and associated with the second virtual object information from the second full display object to the second partial display object.

The selected interactive action obtained by the first terminal may be generating the first virtual reality video image where the first full display object performs the interactive action or generating the first virtual reality video image where the first full display object performs the interactive action and generating the second virtual reality video image where the second full display object performs the interactive action.

Figure 8:
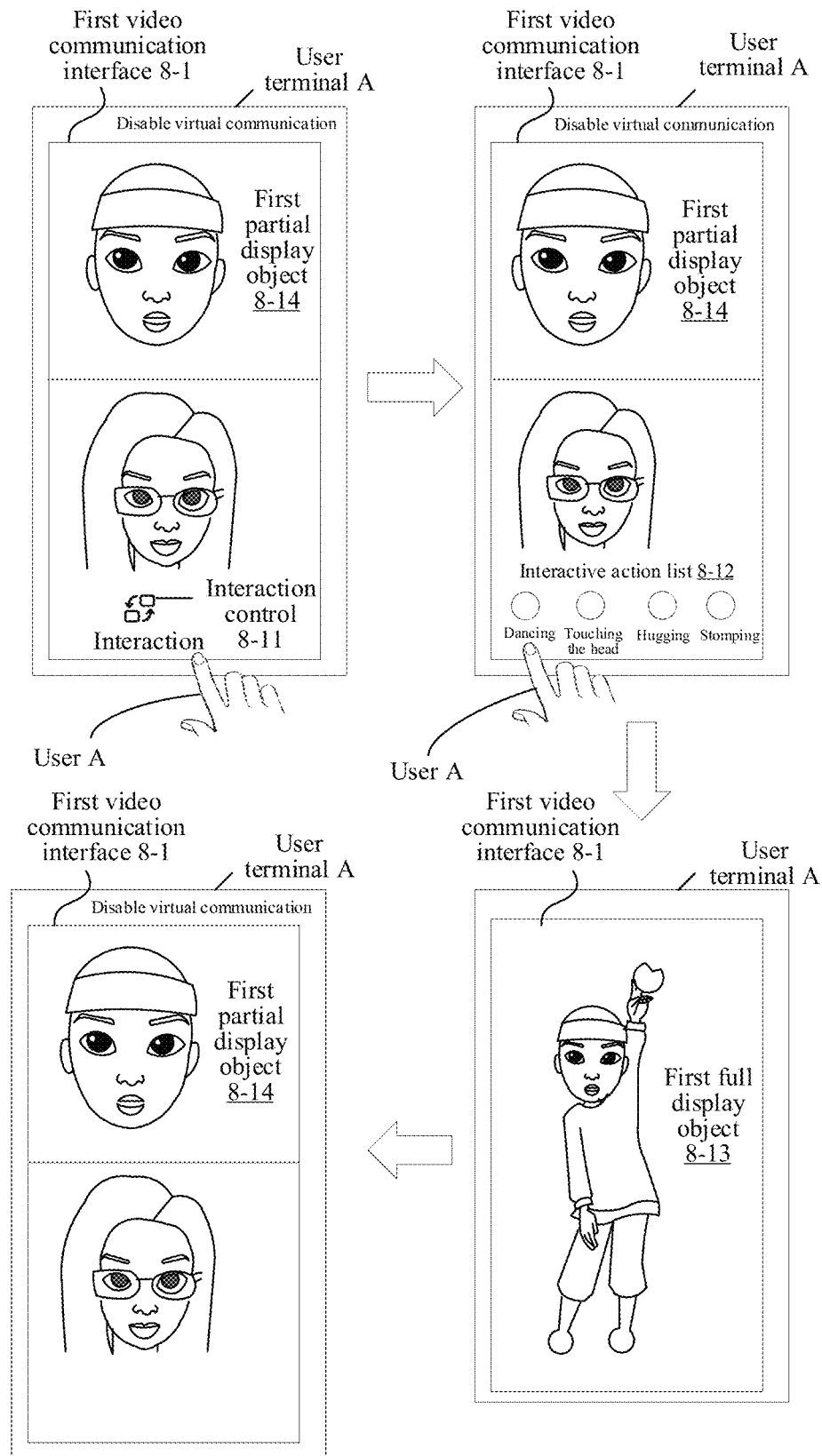
FIG. 8 is a schematic scenario diagram of interaction during virtual reality video communication according to an embodiment of this application.

FIG. 8 is a schematic scenario diagram of interaction during virtual reality video communication according to an embodiment of this application. As shown in FIG. 8, the user terminal A may be any user terminal in the user terminal cluster in FIG. 1. For example, the user terminal A is the user terminal 100*b*. The user A and the user B are performing virtual reality video communication on a first video communication interface 8-1 of user terminal A, and a virtual object model presented on the first video communication interface 8-1 is a first partial display object 8-14. As shown in FIG. 8, the first video communication interface 8-1 includes an interaction control 8-11. After the user A clicks/taps the interaction control 8-11, the user terminal A may display an interactive action list 8-12. As shown in FIG. 8, the interactive action list 8-12 includes interactive actions such as dancing, touching the head, hugging, and stomping, and the user A clicks/taps the interactive action of dancing. Subsequently, the user terminal A may display, on the first video communication interface 8-1, a first full display object 8-13 of the virtual object corresponding to the user A and s first virtual reality video image where the first full display object 8-13 performs the dancing action. Subsequently, when the time corresponding to the action execution duration (for example, 10s) of the dancing action is reached, the virtual object model presented on the first video communication interface 8-1 is restored from the first full display object 8-13 to a first partial display object 8-14.

Still referring to FIG. 8, during the implementation of the virtual reality video communication by the first terminal, the first video communication interface 8-1 further displays a virtual communication disable control, for example, a virtual communication disable button.

In this embodiment of this application, in order to increase the diversity and the interest of the virtual reality video communication, the first terminal may further switch a background of the first video communication interface during the virtual reality video communication of the user. The process of switching the background of the virtual reality video communication is described below by using an example that the first terminal switches the background of the first video communication interface.

The first video communication interface includes a material switching control. When the first user clicks/taps the material switching control for the background, the first terminal receives a material switching operation of triggering the material switching control. At this time, the first terminal may display a configuration material list in response to the material switching operation. Subsequently, the first user may select any configuration material as a target material, and the first terminal may switch a material of the video communication interface to the target material in response to a material selection operation performed by the first user on the configuration material list. The target material is a material selected by the material selection operation, and the target material includes one or both of a static material (for example, a static background image) or a dynamic material (for example, a dynamic background image).

Figure 9A:
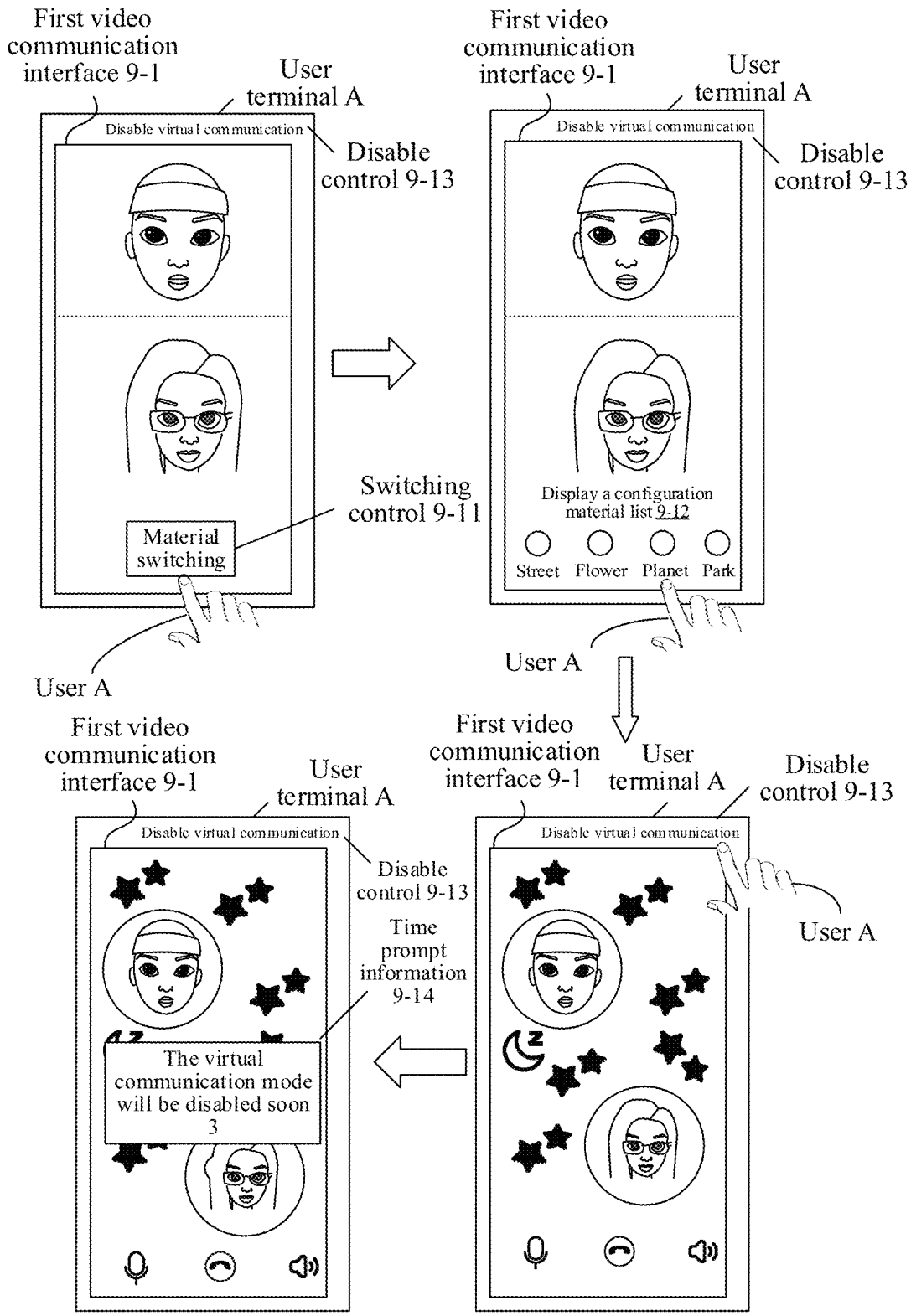
FIG. 9A is a schematic diagram of a scenario of switching a background material during virtual reality video communication according to an embodiment of this application.

FIG. 9A is a schematic diagram of a scenario of switching a background material during virtual reality video communication according to an embodiment of this application. As shown in FIG. 9A, the user terminal A may be any user terminal in the user terminal cluster in FIG. 1. For example, the user terminal A is the user terminal 100*b*. The user A and the user B are performing virtual reality video communication on a first video communication interface 9-1 of user terminal A. The first video communication interface 9-1 includes a material switching control 9-11. After the user A clicks/taps the material switching control 9-11, the user terminal A may display a configuration material list 9-12. As shown in FIG. 9A, the configuration material list 9-12 includes a street material, a flower material, a planet material, and a park material, and the user A clicks/taps the planet material. Subsequently, the user terminal A switches a background material of the first video communication interface 9-1 in the user terminal A to the planet material.

Still referring to FIG. 9A, the first video communication interface 9-1 in the user terminal A includes a disable control 9-13 for virtual reality video communication. When the user A clicks/taps the disable control 9-13, the user terminal A may output time prompt information 9-14 on the first video communication interface 9-1 in response to the trigger operation performed by the user A, to prompt the user A that the virtual reality video communication mode will be disabled after a waiting duration (for example, 3 s). After a time corresponding to the waiting duration is reached, the virtual reality video communication mode will be disabled.

In this embodiment of this application, the interactions between the users during the virtual reality video communication between the users are increased (for example, interactive actions can be selected for interaction, and the background can be switched), thereby increasing the interest and the interactivity of the video communication can be increased, and the quality of the video communication can be improved.

Figure 9B:
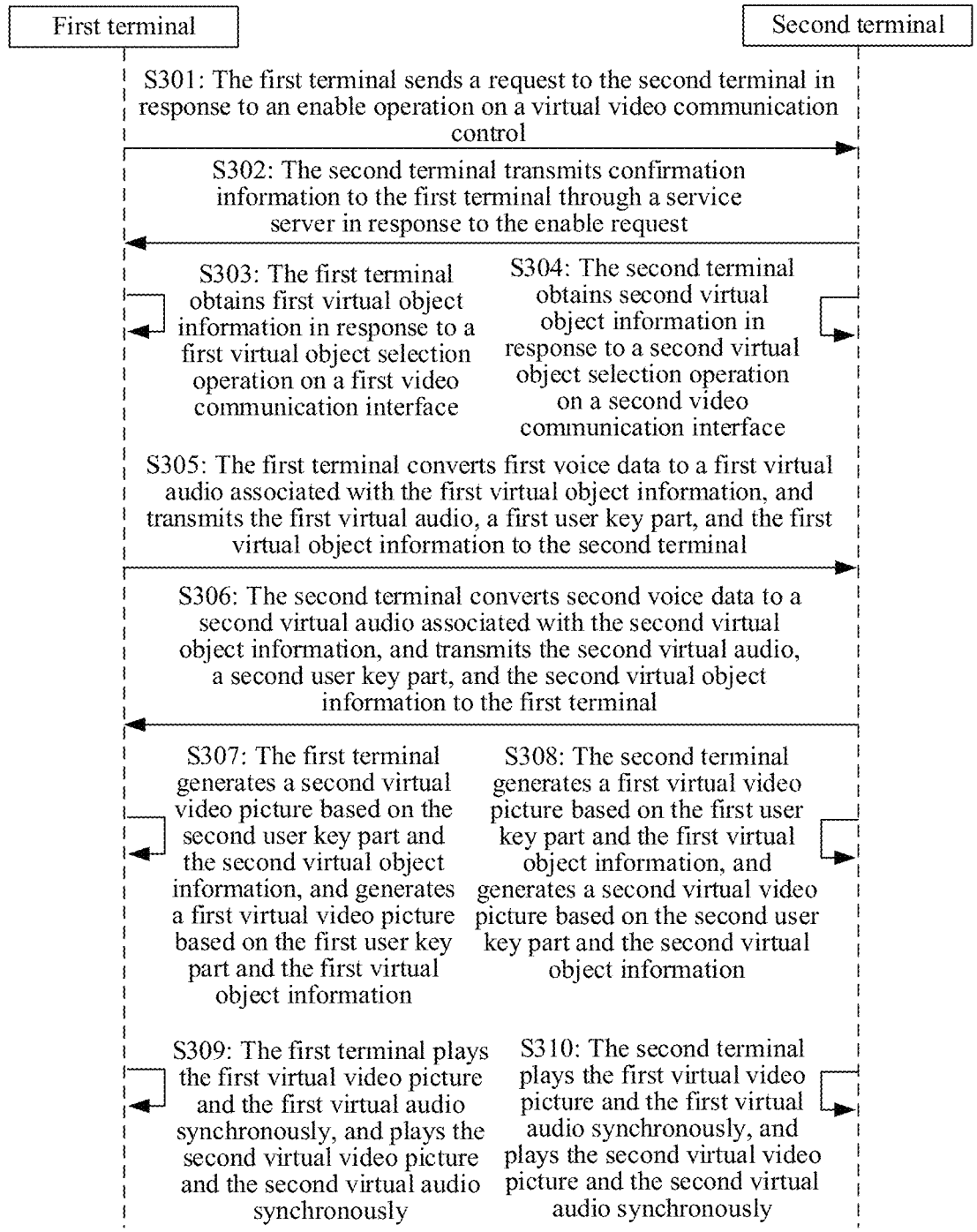
FIG. 9B is a schematic interaction diagram of a method for video communication according to an embodiment of this application.

FIG. 9B is a schematic interaction diagram of a method for video communication according to an embodiment of this application. As shown in FIG. 9B, the method for video communication includes steps S301 to S310, which describes a process of implementing virtual reality video communication between a first terminal and a second terminal through interaction.

S301: The first terminal transmits an enable request to the second terminal in response to an enable operation on a virtual reality video communication control.

S302: The second terminal transmits confirmation information to the first terminal through a service server in response to the enable request.

S303: The first terminal obtains first virtual object information in response to a first virtual object selection operation on a first video communication interface.

S304: The second terminal obtains second virtual object information in response to a second virtual object selection operation on a second video communication interface.

S305: The first terminal converts first voice data to a first virtual audio associated with the first virtual object information, and transmits the first virtual audio, a first user feature, and the first virtual object information to the second terminal.

S306: The second terminal converts second voice data to a second virtual audio associated with the second virtual object information, and transmits the second virtual audio, a second user feature, and the second virtual object information to the first terminal.

S307: The first terminal generates a second virtual reality video image based on the second user feature and the second virtual object information, and generates a first virtual reality video image based on the first user feature and the first virtual object information.

S308: The second terminal generates a first virtual reality video image based on the first user feature and the first virtual object information, and generates a second virtual reality video image based on the second user feature and the second virtual object information.

S309: The first terminal plays the first virtual reality video image and the first virtual audio synchronously, and plays the second virtual reality video image and the second virtual audio synchronously.

S310: The second terminal plays the first virtual reality video image and the first virtual audio synchronously, and plays the second virtual reality video image and the second virtual audio synchronously.

The execution subjects that acquire the first virtual reality video image and the second virtual reality video image are an exemplary description, which may alternatively be a server. This is not limited in this embodiment of this application.

Figure 10:
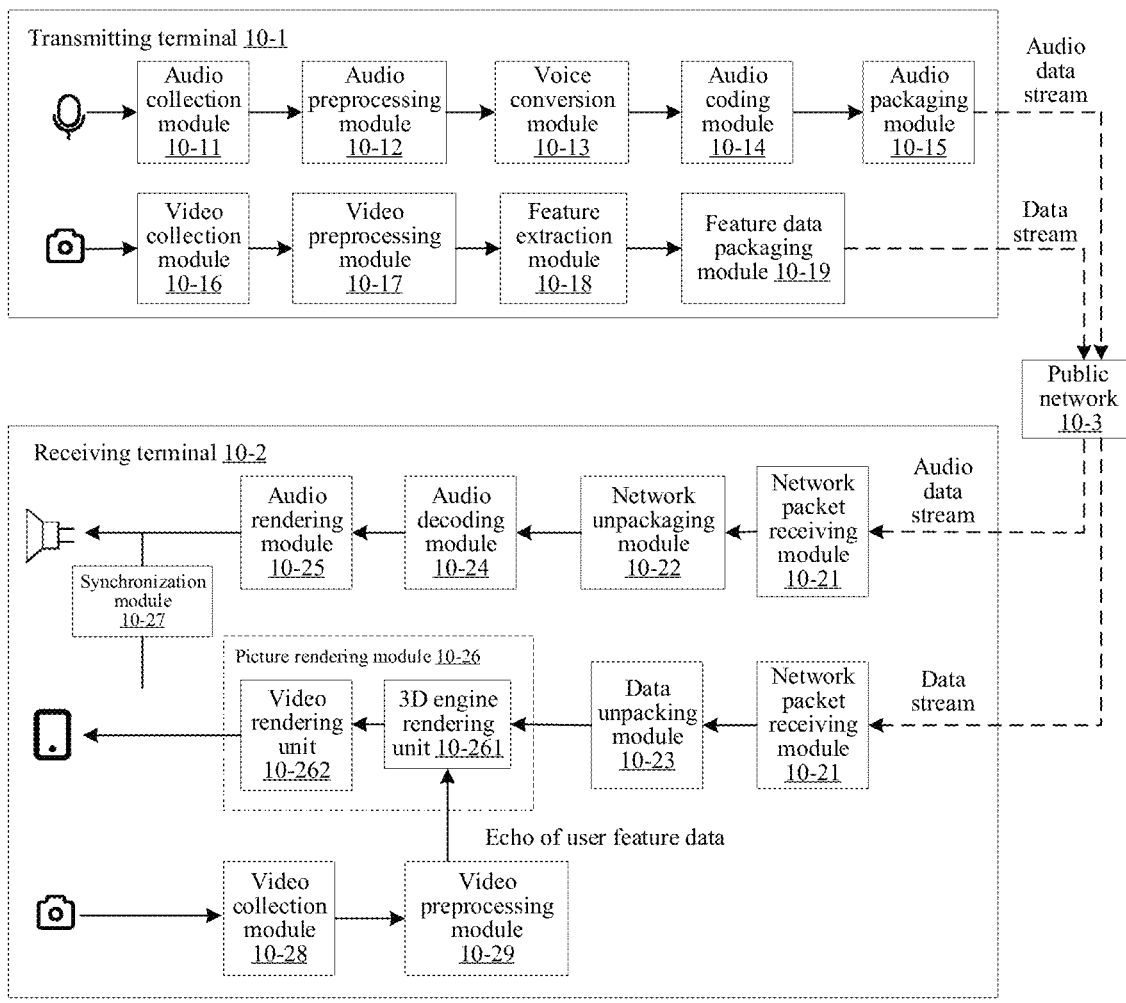
FIG. 10 is a system architecture diagram according to an embodiment of this application.

FIG. 10 is a system architecture diagram according to an embodiment of this application. As shown in FIG. 10, the system architecture diagram may include a transmitting terminal (corresponding to the first terminal) and a receiving terminal (corresponding to the second terminal). When a user of the transmitting terminal (corresponding to the first user) and a user of the receiving terminal (corresponding to the second user) engage in virtual communication, the system switches to an audio processing procedure and a video processing procedure shown in FIG. 10.

As shown in FIG. 10, in the transmitting terminal 10-1, an audio collection module 10-11 is configured to collect voice data of the user.

An audio preprocessing module 10-12 is configured to perform audio preprocessing on the voice data, for example, may perform acoustic echo cancellation (AEC), noise suppression (ANS), automatic gain control (AGC), and mute detection on the audio.

A voice conversion module 10-13 is configured to convert a timbre of the preprocessed audio.

An audio coding module 10-14 is configured to code the converted audio to obtain a coded file.

An audio packing module 10-15 is configured to pack the coded file obtained by the audio coding module 10-14, to obtain an audio data stream.

A video collection module 10-16 is configured to collect video data including a user.

A video preprocessing module 10-17 is configured to preprocess the collected video data, for example, perform processing such as video transcoding and video size adjustment.

A feature extraction module 10-18 is configured to extract feature data of the user in the video data, and track an expression of the user in the video data.

A feature data packing module 10-19 is configured to pack the feature data extracted by the feature extraction module 10-18, to obtain a data stream related to a feature.

As shown in FIG. 10, in the receiving terminal 10-2, a network packet receiving module 10-21 is configured to receive the audio data stream and the data stream related to the feature transmitted by the transmitting terminal 10-1 through a public network 10-3.

A network unpacking module 10-22 is configured to unpack the audio data stream.

A data unpacking module 10-23 is configured to unpack the data stream corresponding to the feature.

An audio decoding module 10-24 is configured to decode the unpacked audio file.

An audio rendering module 10-25 is configured to render the data obtained after the decoding.

A image rendering module 10-26 includes a 3D engine rendering unit 10-261 configured to perform 3D rendering on the feature data obtained by the decoding, and further includes a video rendering unit 10-262 configured to render a virtual image of virtual communication.

A synchronization module 10-27 is configured to synchronize the rendered audio with the rendered image.

A video collection module 10-28 is configured to collect video data of a user corresponding to the receiving terminal 10-2.

A video preprocessing module 10-29 is configured to preprocess the video data of the user of the receiving terminal 10-2, for example, perform processing such as video transcoding and size adjustment. Subsequently, the feature data may be echoed according to the preprocessed video data, and the feature data may be input to the image rendering module 10-26 for image rendering.

It may be understood that, in this embodiment of this application, since the virtual reality video communication function is added, virtual reality video communication experience can be brought to the users, so that the real character images of both the users can be converted to the virtual images. In this way, the interest of the virtual reality video communication is increased for the users in terms of sound and image, thereby effectively improving the experience for the users during the video communication.

Figure 11:
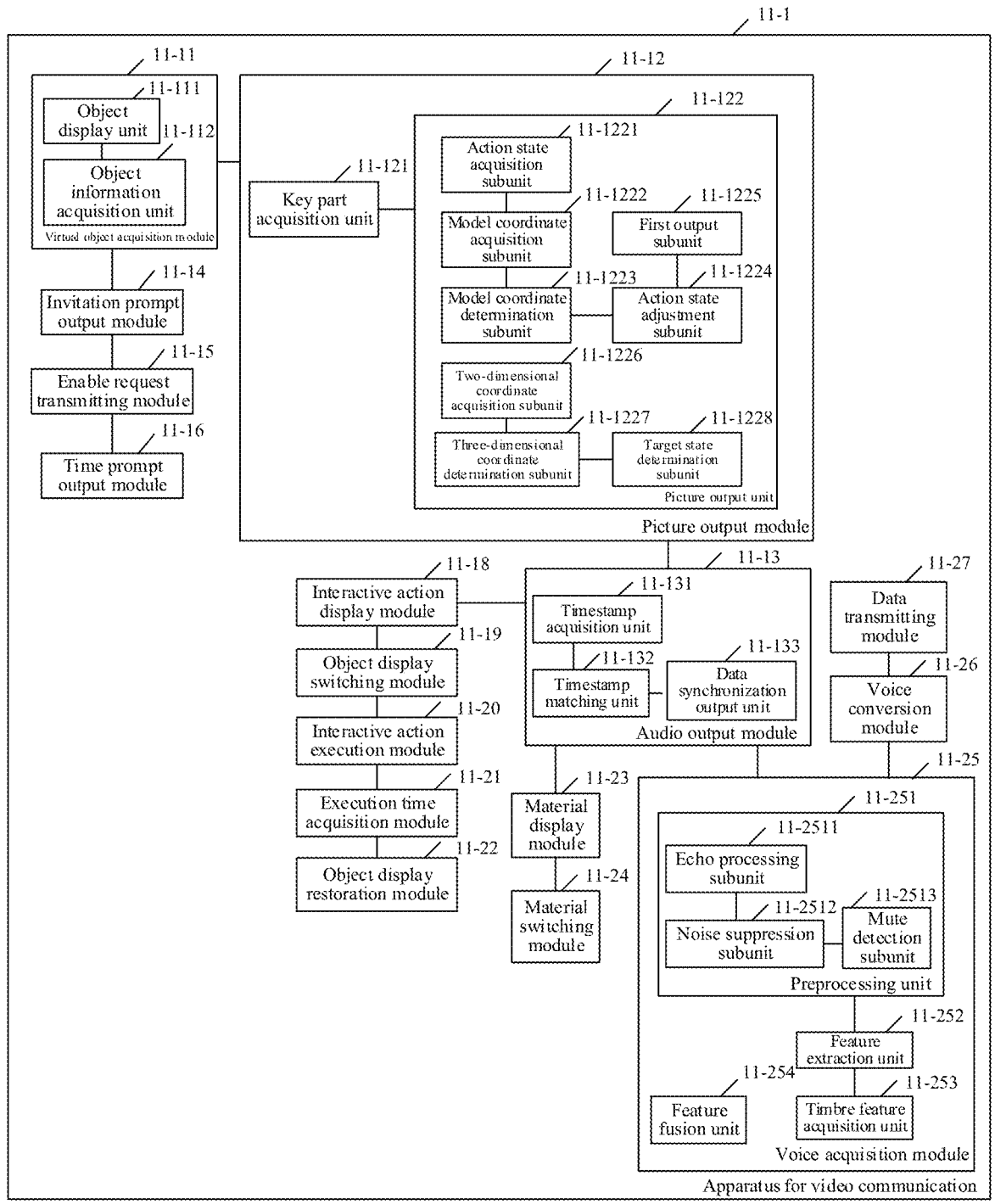
FIG. 11 is a schematic structural diagram of an apparatus for video communication according to an embodiment of this application.

FIG. 11 is a schematic structural diagram of an apparatus for video communication according to an embodiment of this application. The apparatus for video communication may be a computer program (including program code) run on a computer device. For example, the apparatus for video communication is an application software. The apparatus for video communication may be configured to perform the method shown in FIG. 4. As shown in FIG. 11, the apparatus for video communication 11-1 may include a virtual object acquisition module 11-11, an image output module 11-12, and an audio output module 11-13.

The virtual object acquisition module 11-11 is configured to obtain first virtual object information in response to a first virtual object selection operation on a first video communication interface, the first video communication interface being an interface for video communication between the electronic device and a second terminal of the electronic device.

The image output module 11-12 is configured to display a first virtual reality video image and a second virtual reality video image on the first video communication interface, the first virtual reality video image being associated with the first virtual object information and a first user feature, the second virtual reality video image being associated with second virtual object information and a second user feature, and the second virtual object information being obtained by the second terminal in response to a second virtual object selection operation on a second video communication interface.

The audio output module 11-13 is configured to play a target virtual audio, the target virtual audio including one or both of a first virtual audio or a second virtual audio, the first virtual audio being associated with first voice data and the first virtual object information, and the second virtual audio being associated with second voice data and the second virtual object information.

For the corresponding implementations of the virtual object acquisition module 11-11, the image output module 11-12, and the audio output module 11-13, refer to the description corresponding to S101-S103 in FIG. 4.

In this embodiment of this application, the first video communication interface includes a virtual reality video communication control. In this case, the virtual object acquisition module 11-11 may include an object display unit 11-111 and an object information acquisition unit 11-112.

The object display unit 11-111 is configured to display at least one virtual object in response to a trigger operation performed by a first user on the virtual reality video communication control.

The object information acquisition unit 11-112 is configured to acquire selected first virtual object information from the at least one virtual object in response to a virtual object selection operation on the at least one virtual object, the at least one virtual object including the first virtual object information.

For the corresponding implementations of the object display unit 11-111 and the object information acquisition unit 11-112, refer to the description corresponding to S101 in FIG. 4.

Still referring to FIG. 11, the apparatus for video communication 11-1 may further include an invitation prompt output module 11-14, an enable request transmitting module 11-15, and a time prompt output module 11-16.

The invitation prompt output module 11-14 is configured to display invitation prompt information on the first video communication interface in response to an enable operation on the virtual reality video communication control, the invitation prompt information being enable invitation information for the virtual reality video communication control, and the enable invitation information being a prompt message indicating that the electronic device requests the second terminal to enable the virtual reality video communication control.

The enable request transmitting module 11-15 is configured to transmit an enable request for the virtual reality video communication control to the second terminal in response to a confirmation operation on the invitation prompt information.

The time prompt output module 11-16 is configured to receive confirmation information returned by the second terminal for the enable request, and display time prompt information, the time prompt information being a waiting duration before engaging in virtual reality video communication.

In this embodiment of this application, the image output module 11-12 is further configured to display the first virtual reality video image and the second virtual reality video image on the first video communication interface in accordance with a determination that a time corresponding to the waiting duration is reached.

For the corresponding implementations of the invitation prompt output module 11-14, the enable request transmitting module 11-15, and the time prompt output module 11-16, refer to the description corresponding to S102 in FIG. 4.

Still referring to FIG. 11, the audio output module 11-13 may include a timestamp acquisition unit 11-131, a timestamp matching unit 11-132, and a data synchronization output unit 11-133.

The timestamp acquisition unit 11-131 is configured to: acquire a first image timestamp corresponding to the first virtual reality video image and a first voice timestamp corresponding to the first virtual audio; and acquire a second image timestamp corresponding to the second virtual reality video image and a second voice timestamp corresponding to the second virtual audio.

The timestamp matching unit 11-132 is configured to: acquire, from the first voice timestamp, a first target voice timestamp in a time matching relationship with the first image timestamp, and acquire, from the second voice timestamp, a second target voice timestamp in a time matching relationship with the second image timestamp.

The data synchronization output unit 11-133 is configured to: acquire, from the first virtual audio, a first to-be-played virtual audio corresponding to the first target voice timestamp, and acquire, from the second virtual audio, a second to-be-played virtual audio corresponding to the second target voice timestamp; and play the first to-be-played virtual audio and the second to-be-played virtual audio.

For the corresponding implementations of the timestamp acquisition unit 11-131, the timestamp matching unit 11-132, and the data synchronization output unit 11-133, refer to the description corresponding to S103 in FIG. 4.

In this embodiment of this application, a virtual object model displayed in the first virtual reality video image and associated with the first virtual object information is a first partial display object, and a virtual object model displayed in the second virtual reality video image and associated with the second virtual object is a second partial display object.

Still referring to FIG. 11, the apparatus for video communication 11-1 may further include an interactive action display module 11-18, an object display switching module 11-19, and an interactive action execution module 11-20.

The interactive action display module 11-18 is configured to display a virtual object interactive action list in response to an interactive operation on the first video communication interface.

The object display switching module 11-19 is configured to switch the first partial display object to a first full display object and switch the second partial display object to a second full display object, in response to an action selection operation on the virtual object interactive action list.

The interactive action execution module 11-20 is configured to display a image where the first full display object performs a target interactive action, and display a image where the second full display object performs a target interactive action, the target interactive action being an interactive action selected by the action selection operation.

For the corresponding implementations of the interactive action display module 11-18, the object display switching module 11-19, and the interactive action execution module 11-20, refer to the description corresponding to S201-S203 in FIG. 7.

Still referring to FIG. 11, the apparatus for video communication 11-1 may further include an execution time acquisition module 11-21 and an object display restoration module 11-22.

The execution time acquisition module 11-21 is configured to acquire an action execution duration of the target interactive action.

The object display restoration module 11-22 is configured to restore the first full display object to the first partial display object and restore the second full display object to the second partial display object in a case that a time corresponding to the action execution duration is reached.

For the corresponding implementations of the execution time acquisition module 11-21 and the object display restoration module 11-22, refer to the description corresponding to S203 in FIG. 7.

Still referring to FIG. 11, the apparatus for video communication 11-1 may further include a material display module 11-23 and a material switching module 11-24.

The material display module 11-23 is configured to display a configuration material list in response to a material switching operation on the first video communication interface.

The material switching module 11-24 is configured to switch a material on the first video communication interface to a target material in response to a material selection operation on the configuration material list, the target material being a material selected by the material selection operation, and including one or both of a static material or a dynamic material.

For the corresponding implementations of the material display module 11-23 and the material switching module 11-24, refer to the description corresponding to S203 in FIG. 7.

In this embodiment of this application, the first virtual object information includes a first virtual object model, and the second virtual object information includes a second virtual object model. Still referring to FIG. 11, the image output module 11-12 may include a feature acquisition unit 11-121 and an image output unit 11-122.

The feature acquisition unit 11-121 is configured to acquire a first virtual feature from the first virtual object model, and acquire the first user feature, the first virtual feature and the first user feature belonging to a same part type.

The image output unit 11-122 is configured to display the first virtual reality video image on the first video communication interface according to the first virtual feature and the first user feature.

The feature acquisition unit 11-121 is further configured to acquire a second virtual feature from the second virtual object model, and acquire the second user feature, the second virtual feature and the second user feature belonging to a same part type.

The image output unit 11-122 is further configured to display the second virtual reality video image on the first video communication interface according to the second virtual feature and the second user feature.

For the corresponding implementations of the feature acquisition unit 11-121 and the image output unit 11-122, refer to the description corresponding to S102 in FIG. 4.

Still referring to FIG. 11, the image output unit 11-122 may include an action state acquisition subunit 11-1221, a model coordinate acquisition subunit 11-1222, a model coordinate determination subunit 11-1223, an action state adjustment subunit 11-1224, and a first output subunit 11-1225.

The action state acquisition subunit 11-1221 is configured to acquire a part action state corresponding to the first user feature.

The model coordinate acquisition subunit 11-1222 and the model coordinate determination subunit 11-1223 are configured to determine target model position coordinates of the first virtual feature in the part action state according to first model position coordinates of the first virtual feature in a first state and second model position coordinates of the first virtual feature in a second state.

The action state adjustment subunit 11-1224 is configured to adjust the first virtual feature to the target model position coordinates in the first virtual object model to obtain a first target virtual object model, the first virtual feature in the first target virtual object model being used for covering the first user feature.

The first output subunit 11-1225 is configured to display the first virtual reality video image including the target virtual object model on the first video communication interface.

For the corresponding implementations of the action state acquisition subunit 11-1221, the model coordinate acquisition subunit 11-1222, the model coordinate determination subunit 11-1223, the action state adjustment subunit 11-1224, and the first output subunit 11-1225, refer to the description corresponding to S102 in FIG. 4.

Still referring to FIG. 11, the image output unit 11-122 may include a two-dimensional coordinate acquisition subunit 11-1226, a three-dimensional coordinate determination subunit 11-1227, and a target state determination subunit 11-1228.

The two-dimensional coordinate acquisition subunit 11-1226 and the three-dimensional coordinate determination subunit 11-1227 are configured to acquire a position mapping relationship between the first user feature and the first virtual feature.

The target state determination subunit 11-1228 is configured to: adjust a state of the first virtual feature to a part action state of the first user feature in the first virtual object model according to the position mapping relationship, to obtain a second target virtual object model; and output the first virtual reality video image including the second target virtual object model on the first video communication interface.

For the corresponding implementations of the two-dimensional coordinate acquisition subunit 11-1226, the three-dimensional coordinate determination subunit 11-1227, and the target state determination subunit 11-1228, refer to the description corresponding to S102 in FIG. 4.

Still referring to FIG. 11, the apparatus for video communication 11-1 may further include a voice acquisition module 11-25, a voice conversion module 11-26, and a data transmitting module 11-27.

The voice acquisition module 11-25 is configured to acquire the first voice data and the first user feature.

The voice conversion module 11-26 is configured to convert the first voice data to the first virtual audio associated with the first virtual object information.

The data transmitting module 11-27 is configured to transmit the first virtual audio and the first user feature to the second terminal, so that the second terminal displays the first virtual reality video image associated with the first user feature on the second video communication interface and plays the first virtual audio.

For the corresponding implementations of the voice acquisition module 11-25, the voice conversion module 11-26, and the data transmitting module 11-27, refer to the description corresponding to S103 in FIG. 4.

In this embodiment of this application, the first virtual object information includes a first virtual object model and an audio processing model.

The voice conversion module 11-25 may include a preprocessing unit 11-251, a feature extraction unit 11-252, a timbre feature acquisition unit 11-253, and a feature fusion unit 11-254.

The preprocessing unit 11-251 is configured to perform voice preprocessing on the first voice data to obtain transition voice data.

The feature extraction unit 11-252 is configured to extract an audio feature of the transition voice data by using the audio processing model.

The timbre feature acquisition unit 11-253 is configured to acquire a timbre feature associated with the first virtual object model from the audio processing model.

The feature fusion unit 11-254 is configured to: fuse the audio feature with the timbre feature to obtain a fused audio feature; and generate the first virtual audio according to the fused audio feature.

For the corresponding implementations of the preprocessing unit 11-251, the feature extraction unit 11-252, the timbre feature acquisition unit 11-253, and the feature fusion unit 11-254, refer to the description corresponding to S103 in FIG. 4.

Still referring to FIG. 11, the preprocessing unit 11-251 may include an echo processing subunit 11-2511, a noise suppression subunit 11-2512, and a mute detection subunit 11-2513.

The echo processing subunit 11-2511 is configured to delete echo audio data from the first voice data to obtain echo transition voice data.

The noise suppression subunit 11-2512 is configured to suppress noise audio data in the echo transition voice data to obtain noise transition voice data.

The mute detection subunit 11-2513 is configured to delete mute audio data from the noise transition voice data to obtain the transition voice data.

For the specific implementations of the echo processing subunit 11-2511, the echo processing subunit 11-2512, and the mute detection subunit 11-2513, refer to the description corresponding to S103 in FIG. 4.

In this embodiment of this application, since the virtual object is added to the video communication application, the users can select any virtual object and switch the real images to the selected virtual objects, and the users can perform communication by using the virtual objects as images. That is to say, in this application, during the video communication performed by the users, the images of the users can be converted to the virtual images for communication, and the virtual images of the users can be viewed without a need to suspend the video communication. In addition, during the video communication performed by the users, the heard audio of the other party is the virtual audio rather than the original voice data of the user. Therefore, the quality of video communication can be improved. It may be understood that, in this application, the images of the users in the video communication application are enriched, so that the virtual reality video communication between users can be performed, and the normal operation and display of the video communication between the users can be maintained when the virtual data is displayed. In addition, during the virtual reality video communication, the user voice data is converted to the virtual audio for output, which can improve the quality of the video communication. That is to say, in this application, more video display manners and interest can be realized during the video communication, and the normal operation and display of the video communication can be maintained while displaying the virtual data, thereby improving the quality of the video communication.

Figure 12:
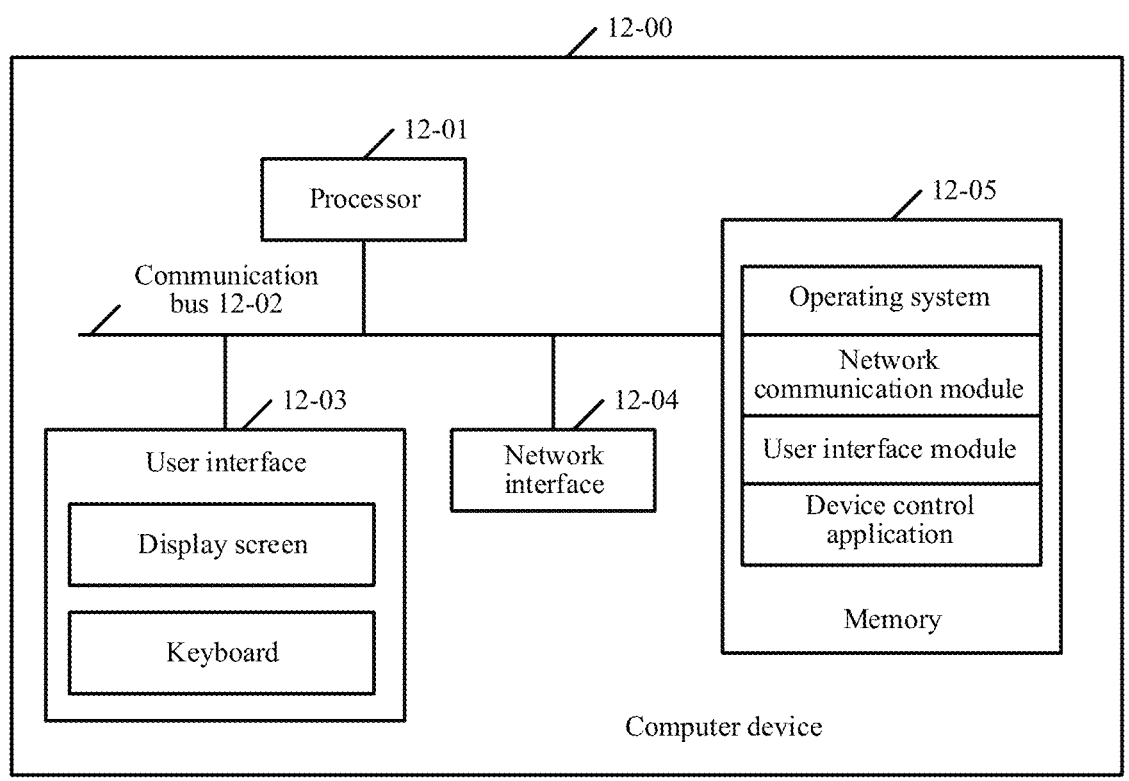
FIG. 12 is a schematic structural diagram of a computer device according to an embodiment of this application.

FIG. 12 is a schematic structural diagram of a computer device according to an embodiment of this application. As shown in FIG. 12, the electronic device for video communication may be implemented as a computer device. In this case, the apparatus for video communication 11-11 in FIG. 11 may be applied to a computer device 12-00. The computer device 12-00 may include a processor 12-01, a network interface 12-04, and a memory 12-05. In addition, the computer device 12-00 further includes a user interface 12-03 and at least one communication bus 12-02. The communication bus 12-02 is configured to implement connection and communication between the components. The user interface 12-03 may include a display and a keyboard. In some embodiments, the user interface 12-03 may further include a standard wired interface and a wireless interface. In some embodiments, the network interface 12-04 may include a standard wired interface and a standard wireless interface (such as a Wi-Fi interface). The memory 12-05 may be a high-speed RAM, or may be a non-volatile memory, for example, at least one magnetic disk memory. In some embodiments, the memory 12-05 may be at least one storage apparatus that is located far away from the foregoing processor 12-01. As shown in FIG. 12, the memory 12-05 used as a computer-readable storage medium may include an operating system, a network communication module, a user interface module, and a device-control application program.

In the computer device 12-00 shown in FIG. 12, the network interface 12-04 may provide a network communication function; the user interface 12-03 is mainly configured to provide an input interface for the user; and the processor 12-01 may be configured to invoke a device control application stored in the memory 12-05 to implement the method for video communication provided in this embodiment of this application.

The computer device 12-00 described in this embodiment of this application may perform the description of the method for video communication in FIG. 4, and may also perform the description corresponding to the video communication apparatus 11-1 in FIG. 11.

This embodiment of this application further provides a computer-readable storage medium. The computer-readable storage medium stores a computer program executed by the computer device 12-00, and the computer program includes program instructions. When executing the program instructions, the processor can perform the descriptions of the method for video communication in the embodiment corresponding to FIG. 4. For technical details that are not disclosed in the embodiments of the computer-readable storage medium of this application, refer to the method embodiments of this application.

The computer-readable storage medium may be the apparatus for video communication provided in the embodiments of this application or an internal storage unit of the above computer device, such as a hard disk or a memory of the computer device. The computer-readable storage medium may also be an external storage device of the computer device, such as a plug-in hard disk, a smart media card (SMC), a secure digital (SD) card, or a flash card that is equipped on the computer device. Further, the computer-readable storage medium may also include an internal storage unit of the computer device and an external storage device. The computer-readable storage medium is configured to store the computer program and other programs and data required by the computer device. The computer-readable storage medium may be further configured to temporarily store data that has been or will be output.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the method for video communication provided in this embodiment of this application.

In this embodiment of this application, claims, and accompanying drawings of this application, the terms "first" and "second" are intended to distinguish between different objects but do not indicate a particular order. In addition, the term "include" and any variant thereof are intended to cover a non-exclusive inclusion. For example, a process, method, apparatus, product, or device that includes a series of steps or modules is not limited to the listed steps or modules; and instead, further includes a step or module that is not listed, or further includes another step or unit that is intrinsic to the process, method, apparatus, product, or device, in some embodiments.

A person of ordinary skill in the art may be aware that the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The method and the related apparatuses provided in the embodiments of this application are described with reference to the method flowcharts and/or schematic structural diagrams provided in the embodiments of this application. Specifically, each flow and/or block of the method flowcharts and/or the schematic structural diagrams and combinations of the flows and/or the blocks in the flowcharts and/or the block diagrams may be implemented by using computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A method for virtual video communication, performed by an electronic device, the method comprising:

selecting a first virtual object on a first video communication interface and obtaining associated first virtual object information, the first video communication interface being an interface for video communication between the electronic device and a second electronic device;

displaying a first virtual video image and a second virtual video image on the first video communication interface, wherein the first virtual video image corresponds to the first virtual object information and a first user associated with the electronic device, the second virtual video image corresponds to second virtual object information and a second user associated with the second electronic device, wherein the second virtual object information is obtained by selecting a second virtual object on a second video communication interface;

capturing first voice data of the first user;

converting the first voice data to a first virtual audio in accordance with the first virtual object information;

transmitting the first virtual audio and the first virtual video image associated with the first user to the second electronic device, wherein the second electronic device is configure to display the first virtual video image associated with the first user and play the first virtual audio synchronously on the second video communication interface;

receiving a second virtual audio from the second electronic device, wherein the second virtual audio is converted from second voice data of the second user in accordance with the second virtual object information; and playing the second virtual audio in synchronization with the displaying of first virtual video image and the second virtual video image on the first video communication interface.

2. The method according to claim 1, wherein the first video communication interface comprises a virtual video communication control; and obtaining the first virtual object information comprises:

in response to a trigger operation on the virtual video communication control, displaying at least one virtual object; and obtaining information corresponding to a virtual object selected from the at least one virtual object as the first virtual object information.

3. The method according to claim 2, further comprising:

in response to receiving an input to enable virtual video communication on the virtual video communication control, displaying invitation prompt information on the first video communication interface indicating that the electronic device requests the second terminal to enable the virtual video communication control;

in response to a confirmation operation on the invitation prompt information: transmitting a request for the virtual video communication control to the second terminal;

in response to receiving a confirmation from the second terminal, display a countdown prompt, the countdown prompt indicating a waiting duration before virtual video communication commences; and displaying a first virtual video image and a second virtual video image on the first video communication interface comprises:

displaying the first virtual video image and the second virtual video image on the first video communication interface in accordance with a determination that a time corresponding to the waiting duration is reached.

4. The method according to claim 1, wherein in accordance with a determination that the target virtual audio comprises the first virtual audio and the second virtual audio, playing a target virtual audio comprises:

acquiring a first image timestamp of the first virtual video image and a first voice timestamp of the first virtual audio;

acquiring a second image timestamp of the second virtual video image and a second voice timestamp of the second virtual audio;

acquiring, from the first voice timestamp, a first target voice timestamp that matches the first image timestamp, and acquiring, from the second voice timestamp, a second target voice timestamp that matches the second image timestamp;

acquiring, from the first virtual audio, a first to-be-played virtual audio corresponding to the first target voice timestamp, and acquiring, from the second virtual audio, a second to-be-played virtual audio corresponding to the second target voice timestamp; and playing the first to-be-played virtual audio and the second to-be-played virtual audio.

5. The method according to claim 1, wherein a virtual object model displayed in the first virtual video image is a first partial display object, and a virtual object model displayed in the second virtual video image is a second partial display object; and the method further comprises:

displaying a virtual object interactive action list in response to an interactive operation on the first video communication interface;

in response to detecting a selection on the virtual object interactive action list, switching the first partial display object to a first full display object and switching the second partial display object to a second full display object; and displaying an image of the first full display object performing a target interactive action corresponding to the selection, and displaying an image of the second full display object performing target interactive action corresponding to the selection.

6. The method according to claim 5, further comprising:

obtaining an action execution duration of the target interactive action; and in accordance with a determination that a time corresponding to the action execution duration is reached, restoring the first full display object to the first partial display object and restoring the second full display object to the second partial display object.

7. The method according to claim 1, further comprising:

in response to detecting a material switching operation on the first video communication interface: displaying a configuration material list; and in response to a material selection operation on the configuration material list: switching a material on the first video communication interface to a target material, comprising one or both of a static material or a dynamic material, selected by the material selection operation.

8. The method according to claim 1, wherein the first virtual object information comprises a first virtual object model, and the second virtual object information comprises a second virtual object model; and displaying the first virtual video image and a second virtual video image on the first video communication interface comprises:

acquiring a first virtual feature from the first virtual object model corresponding to the first user;

displaying the first virtual video image on the first video communication interface according to the first virtual feature and the first user;

acquiring a second virtual feature from the second virtual object model corresponding to the second user; and displaying the second virtual video image on the first video communication interface according to the second virtual feature and the second user.

9. The method according to claim 8, wherein displaying the first virtual video image according to the first virtual feature and the first user comprises:

obtaining a part action state corresponding to the first user;

determining target model position coordinates of the first virtual feature in the part action state according to first model position coordinates of the first virtual feature in a first state and second model position coordinates of the first virtual feature in a second state;

adjusting the first virtual feature to the target model position coordinates in the first virtual object model to obtain a first target virtual object model, the first virtual feature in the first target virtual object model being used for displaying the first user; and displaying the first virtual video image comprising the target virtual object model on the first video communication interface.

10. The method according to claim 8, wherein displaying the first virtual video image according to the first virtual feature and the first user comprises:
mapping the first user to the first virtual feature;
adjusting a state of the first virtual feature to a part action state of the first user in the first virtual object model based on the mapping to obtain a second target virtual object model; and
displaying the first virtual video image comprising the second target virtual object model on the first video communication interface.

11. The method according to claim 1, wherein the first virtual object information comprises a first virtual object model and an audio processing model; and
converting the first voice data to the first virtual audio comprises:
performing voice preprocessing on the first voice data to obtain transition voice data;
extracting, using the audio processing model, an audio feature of the transition voice data;
acquiring a timbre feature associated with the first virtual object model from the audio processing model;
fusing the audio feature with the timbre feature to obtain a fused audio feature; and
generating the first virtual audio according to the fused audio feature.

12. The method according to claim 11, wherein performing voice preprocessing comprises:
deleting echo audio data from the first voice data to obtain echo transition voice data;
suppressing noise audio data in the echo transition voice data to obtain noise transition voice data; and
deleting mute audio data from the noise transition voice data to obtain the transition voice data.

13. An electronic device, comprising:
one or more processors; and
memory storing one or more programs, the one or more programs comprising instructions that, when executed by the one or more processors, cause the one or more processors to perform operations comprising:
selecting a first virtual object on a first video communication interface and obtaining associated first virtual object information, the first video communication interface being an interface for video communication between the electronic device and a second electronic device;
displaying a first virtual video image and a second virtual video image on the first video communication interface, wherein the first virtual video image corresponds to the first virtual object information and a first user associated with the electronic device, the second virtual video image corresponds to second virtual object information and a second user associated with the second electronic device, wherein the second virtual object information is obtained by selecting a second virtual object on a second video communication interface;
capturing first voice data of the first user;
converting the first voice data to a first virtual audio in accordance with the first virtual object information;
transmitting the first virtual audio and the first virtual video image associated with the first user to the second electronic device, wherein the second electronic device is configure to display the first virtual video image associated with the first user and play the first virtual audio synchronously on the second video communication interface;
receiving a second virtual audio from the second electronic device, wherein the second virtual audio is converted from second voice data of the second user in accordance with the second virtual object information; and
playing the second virtual audio in synchronization with the displaying of first virtual video image and the second virtual video image on the first video communication interface.

14. The electronic device according to claim 13, wherein the first video communication interface comprises a virtual video communication control; and
obtaining the first virtual object information comprises:
in response to a trigger operation on the virtual video communication control, displaying at least one virtual object; and
obtaining information corresponding to a virtual object selected from the at least one virtual object as the first virtual object information.

15. The electronic device according to claim 13, further comprising:
in response to receiving an input to enable virtual video communication on the virtual video communication control, displaying invitation prompt information on the first video communication interface indicating that the electronic device requests the second terminal to enable the virtual video communication control;
in response to a confirmation operation on the invitation prompt information: transmitting a request for the virtual video communication control to the second terminal;
in response to receiving a confirmation from the second terminal, display a countdown prompt, the countdown prompt indicating a waiting duration before virtual video communication commences; and
displaying a first virtual video image and a second virtual video image on the first video communication interface comprises:
displaying the first virtual video image and the second virtual video image on the first video communication interface in accordance with a determination that a time corresponding to the waiting duration is reached.

16. The electronic device of claim 13, wherein in accordance with a determination that the target virtual audio comprises the first virtual audio and the second virtual audio, playing a target virtual audio comprises:
acquiring a first image timestamp of the first virtual video image and a first voice timestamp of the first virtual audio;
acquiring a second image timestamp of the second virtual video image and a second voice timestamp of the second virtual audio;
acquiring, from the first voice timestamp, a first target voice timestamp that matches the first image timestamp, and acquiring, from the second voice timestamp, a second target voice timestamp that matches the second image timestamp;
acquiring, from the first virtual audio, a first to-be-played virtual audio corresponding to the first target voice timestamp, and acquiring, from the second virtual audio, a second to-be-played virtual audio corresponding to the second target voice timestamp; and
playing the first to-be-played virtual audio and the second to-be-played virtual audio.

17. A non-transitory computer-readable storage medium, storing a computer program, the computer program, when executed by one or more processors of an electronic device, cause the one or more processors to perform operations comprising:
   one or more processors; and
   memory storing one or more programs, the one or more programs comprising instructions that, when executed by the one or more processors, cause the one or more processors to perform operations comprising:
   selecting a first virtual object on a first video communication interface and obtaining associated first virtual object information, the first video communication interface being an interface for video communication between the electronic device and a second electronic device;
   displaying a first virtual video image and a second virtual video image on the first video communication interface, wherein the first virtual video image corresponds to the first virtual object information and a first user associated with the electronic device, the second virtual video image corresponds to second virtual object information and a second user associated with the second electronic device, wherein the second virtual object information is obtained by selecting a second virtual object on a second video communication interface;
   capturing first voice data of the first user;
   converting the first voice data to a first virtual audio in accordance with the first virtual object information;
   transmitting the first virtual audio and the first virtual video image associated with the first user to the second electronic device, wherein the second electronic device is configure to display the first virtual video image associated with the first user and play the first virtual audio synchronously on the second video communication interface;
   receiving a second virtual audio from the second electronic device, wherein the second virtual audio is converted from second voice data of the second user in accordance with the second virtual object information; and
   playing the second virtual audio in synchronization with the displaying of first virtual video image and the second virtual video image on the first video communication interface.

18. The non-transitory computer-readable storage medium according to claim 17, wherein the first video communication interface comprises a virtual video communication control; and
   obtaining the first virtual object information comprises:
   in response to a trigger operation on the virtual video communication control, displaying at least one virtual object; and
   obtaining information corresponding to a virtual object selected from the at least one virtual object as the first virtual object information.

19. The non-transitory computer-readable storage medium according to claim 17, wherein in accordance with a determination that the target virtual audio comprises the first virtual audio and the second virtual audio, playing a target virtual audio comprises:
   acquiring a first image timestamp of the first virtual video image and a first voice timestamp of the first virtual audio;
   acquiring a second image timestamp of the second virtual video image and a second voice timestamp of the second virtual audio;
   acquiring, from the first voice timestamp, a first target voice timestamp that matches the first image timestamp, and acquiring, from the second voice timestamp, a second target voice timestamp that matches the second image timestamp;
   acquiring, from the first virtual audio, a first to-be-played virtual audio corresponding to the first target voice timestamp, and acquiring, from the second virtual audio, a second to-be-played virtual audio corresponding to the second target voice timestamp; and
   playing the first to-be-played virtual audio and the second to-be-played virtual audio.

* * * * *